(12) United States Patent
Anima et al.

(10) Patent No.: US 9,986,376 B1
(45) Date of Patent: May 29, 2018

(54) SURFACING REAL-TIME NOTIFICATIONS BASED ON LOCATION

(71) Applicant: Google Inc., Mountain View, CA (US)

(72) Inventors: Mario Ventura Anima, Sunnyvale, CA (US); James Kevin Rodgers, Sunnyvale, CA (US); Kevin Ferguson, San Francisco, CA (US)

(73) Assignee: Google LLC, Mountain View, CA (US)

( * ) Notice: Subject to any disclaimer, the term of this patent is extended or adjusted under 35 U.S.C. 154(b) by 106 days.

(21) Appl. No.: 14/677,346

(22) Filed: Apr. 2, 2015

Related U.S. Application Data

(60) Provisional application No. 61/977,251, filed on Apr. 9, 2014.

(51) Int. Cl.
  *H04W 4/02* (2018.01)
  *H04L 29/08* (2006.01)
(52) U.S. Cl.
  CPC .............. *H04W 4/021* (2013.01); *H04L 67/18* (2013.01); *H04W 4/028* (2013.01)
(58) Field of Classification Search
  CPC .......... H04W 4/02; H04W 4/021; H04L 67/18
  USPC ........................................................ 455/456.3
  See application file for complete search history.

(56) References Cited

U.S. PATENT DOCUMENTS

| | | | | |
|---|---|---|---|---|
| 2010/0332326 A1* | 12/2010 | Ishai | ...................... | G06Q 10/10 705/14.58 |
| 2011/0035284 A1* | 2/2011 | Moshfeghi | .............. | G06Q 30/02 705/14.58 |
| 2012/0002241 A1* | 1/2012 | Chatow | .................. | G06Q 10/00 358/1.15 |
| 2012/0019867 A1* | 1/2012 | Prati | ...................... | G06F 3/1204 358/1.15 |
| 2012/0302259 A1* | 11/2012 | Busch | ...................... | H04W 4/02 455/456.3 |
| 2013/0030931 A1* | 1/2013 | Moshfeghi | .............. | G01S 19/48 705/16 |
| 2013/0095857 A1* | 4/2013 | Garcia | .................... | H04W 4/02 455/456.3 |
| 2013/0137464 A1* | 5/2013 | Kramer | .................. | G06Q 30/02 455/456.3 |

OTHER PUBLICATIONS

Gorman, "San Francisco Giants (and most of MLB) adopt Apple's iBeacon for an enhanced ballpark experience." @Numeson, Mar. 28, 2014, at 12:31:00 PM ET, www.engadget.com/2014/03/28/san-francisco-giants-mlb-ibeacon/.

* cited by examiner

*Primary Examiner* — King Poon
*Assistant Examiner* — Vincent Peren
(74) *Attorney, Agent, or Firm* — Patent Law Works LLP

(57) ABSTRACT

A system comprising a processor and a memory storing instructions that, when executed, cause the system to determine an identification for a user; determine a location of the user; retrieve a first set of information related to the location and the identification; retrieve relationship information using the identification for the user; determine notification information by filtering the first set of information using the relationship information; generate a notification related to the location of the user and including the notification information; and provide the notification for presentation to the user. The disclosure also includes similar methods and computer program products.

24 Claims, 17 Drawing Sheets

SURFACING REAL-TIME NOTIFICATIONS BASED ON LOCATION

RELATED APPLICATIONS

This application claims the benefit of U.S. Provisional Application Ser. No. 61/977,251, filed Apr. 9, 2014 which is hereby incorporated by reference.

BACKGROUND

The present disclosure relates to surfacing real-time notifications based on location.

The popularity and use of the Internet, web browsers, social networks and other types of electronic communication has grown dramatically in recent years. In particular, social networks now include a great amount of content including posts, images, endorsements, activity, videos, etc. Users are interested in viewing content related to particular web pages or other web information from other sources, but there are only limited ways presently to view information from social networks in other contexts.

During the same period, the use and proliferation of smart phones has increased greatly. Additionally, coarse location information can be provided by many phones, tablet or other portable communication devices. However, it remains difficult to use this coarse location information other than to show maps and provide directions.

SUMMARY

The present disclosure relates to systems and methods for surfacing real-time notifications based on location. According to one innovative aspect of the subject matter in this disclosure, a system having one or more processors and a memory storing instructions that, when executed, cause the system to: determine an identification for a user; determine a location of the user; retrieve a first set of information related to the location and the identification; retrieve relationship information using the identification for the user; determine notification information by filtering the first set of information using the relationship information; generate a notification related to the location of the user and including the notification information; and provide the notification for presentation to the user.

In general, another innovative aspect of the subject matter described in this disclosure may be implemented in methods that include determining, using one or more processors, an identification for a user; determining, using the one or more processors, a location of the user; retrieving, using the one or more processors, a first set of information related to the location and the identification; retrieving, using the one or more processors, relationship information using the identification for the user; determining, using the one or more processors, notification information by filtering the first set of information using the relationship information; generating, using the one or more processors, a notification related to the location of the user and including the notification information; and providing, using the one or more processors, the notification for presentation to the user.

Other implementations of one or more of these aspects include corresponding systems, apparatus, and computer programs, configured to perform the actions of the methods, encoded on computer storage devices.

These and other implementations may each optionally include one or more of the following features. For example, the determining the location may include identifying a place associated with the location, and operations may further comprise associating the place with the user and the location; and storing a time and place in a history for the identification. For instance features may include: retrieving the relationship information retrieves information from a social network using the identification and the location; the filtered first set of information includes an action performable by the user, and the notification includes a link to perform the action; the action is one from the group of: viewing a post, viewing places nearby, performing an action on a social network, interacting with a device, determining people nearby, performing a transaction, updating a profile, providing authorization or providing consent; and the relationship information includes authentication and credential information that can be used to filter data from the first set of information. For instance, the operations may further include determining a device proximate the location, the device being controllable using the identification; and wherein the notification includes a link to an interface to control the device. In some instances, the operations may further include determining a service related to the location, the service being controllable using the identification; and wherein the notification includes a link to an interface to access the service.

These implementations are particularly advantageous in a number of respects. For instance, the technology described herein can surface notifications based on location in real time. Additionally, the system once enabled generates notifications automatically for the user without need for user input or interaction. Moreover, the notifications are specifically tailored to the user based on location/places, relationships of the user from a social network and user identity. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Systems, methods and interfaces for surfacing real-time notifications based on location are disclosed. While the systems, methods and interfaces of the present disclosure are described in the context of web pages or mobile device screens and showing related posts and other content from a social network, it should be understood that the systems, methods and interfaces can be applied to other systems external to the social network for surfacing real-time notifications based on location.

Figure 1:
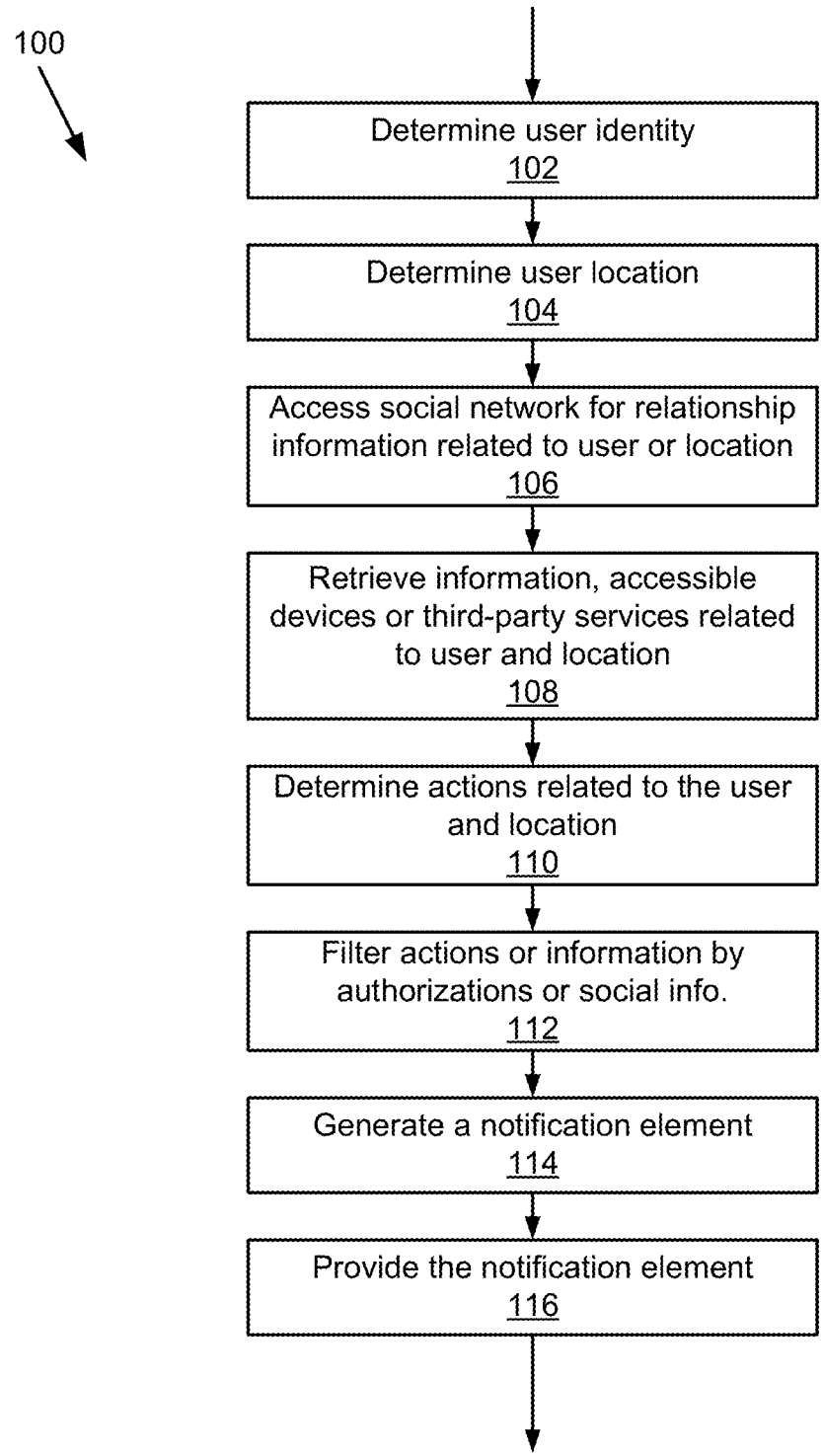
FIG. 1 is a flow chart of an example method for surfacing real-time notifications based on location.

FIG. 1 is a flow chart of an example method 100 for surfacing real-time notifications based on location will be described. The method 100 begins by determining 102 a user identity. For example, the method 100 determines an identification for a user. This may be done by using the user ID and password associated with the portable device. This may also be done using the username and password for the social network 1009. As described, various other identifications of the user can be used and are one input that is used to generate the notification element. Next the method 100 determines 104 a location of the user. The location of the user can be determined using a variety of location technologies and querying the client device 1015 of the user, for example. The location of the user may also be determined by requesting the location information from the location server 1011. In addition, the method 100 may identify a place associated with the location. In some implementations, the method 100 includes associating the place with the user and the location; and storing a time and place in a history for the identification. The method 100 continues by accessing 106 a social network for relationship information related to the user or the location or both. For example, the identification of the user may be used to access the social graph of the social network for information about other users that have a relationship with the user. The relationship information may include groupings of individuals, credentials or authorizations. The method 100 may also access the social network to determine the interest of the user or other social information about the user. In another example, the location or place determined in block 104 may be used to access 106 the social network and retrieve posts, photos, conversations, videos, related to the location or place. Next the method 100 retrieves 108 a first set of information related to the location and the identification. For example, the notification surfacing module 1003 may retrieve information, a list of accessible devices, a list of third-party services related to the user and the location. Next, the method 100 determines 110 any actions that the user may perform by virtue of the location and the identification of the user. For example, in the number of social network actions may be taken based upon the location of the user. Similarly, particular third-party services may be available in a particular location and therefore actions on those third-party services may be taken. Additionally, some physical devices in the location or place may be activated or interacted with and thus are identified. Example actions include: viewing a post, viewing places nearby, performing an action on a social network, interacting with a device, determining people nearby, performing a transaction, updating a profile, providing authorization or providing consent. Next the method 100 filters 112 actions or information using the relationship information obtained in block 106. In some implementations the method 100 determines notification information by filtering the set of information using the relationship information, then ranks the filtered information to identify one portion of notification information to including the notification. The method then generates 114 a notification element and provides 116 the notification element for presentation to the user.

Figure 2:
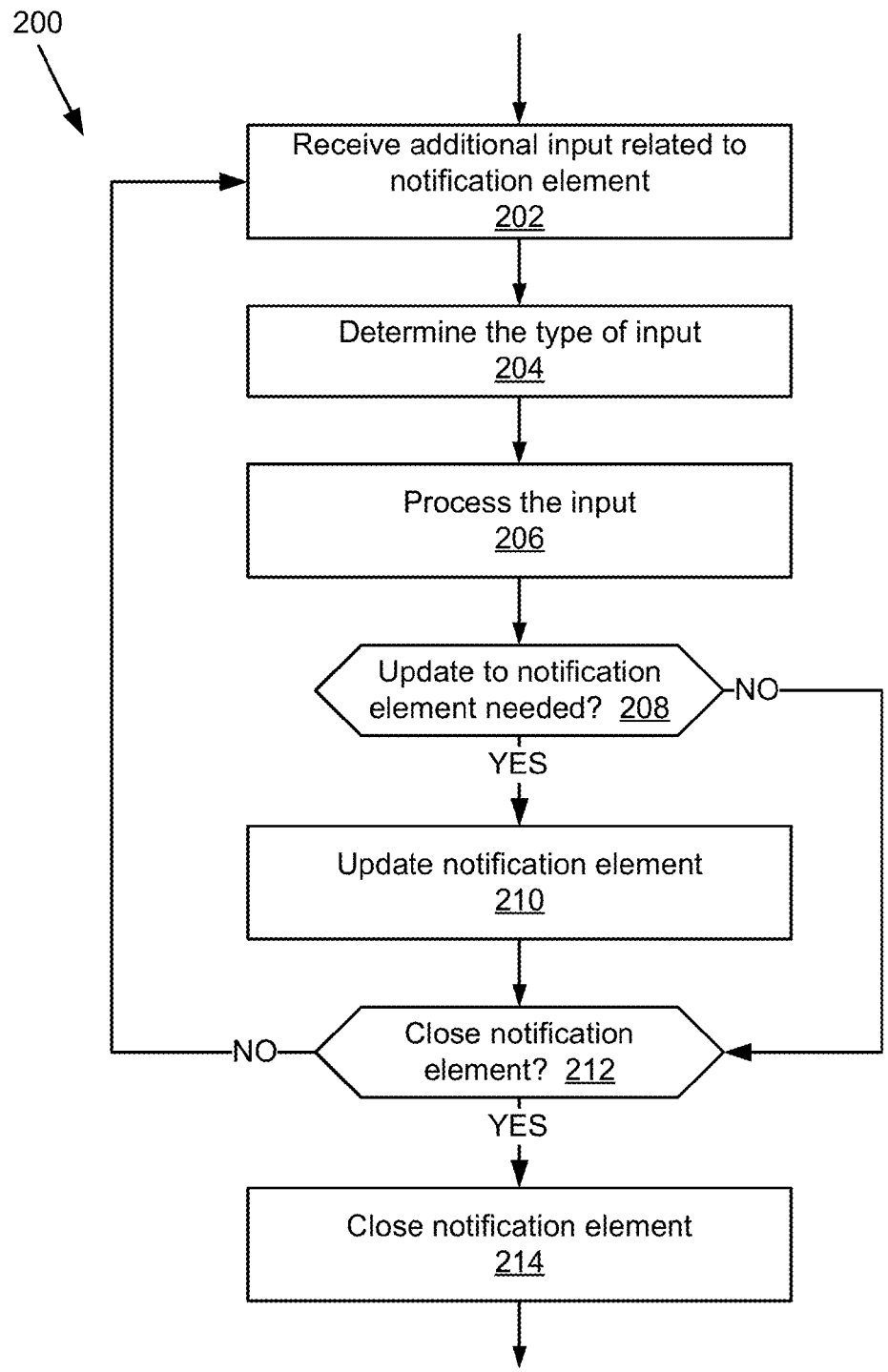
FIG. 2 is a flow chart of an example method for interacting with a surfaced real-time notification.

FIG. 2 shows an example method 200 for interacting with a surfaced real-time notification. Before the method 200 of FIG. 2 begins, the method 100 of FIG. 1 has been performed to generate a surface notification based on user location and identity. Example notifications are depicted and described below with reference to FIGS. 5A-5D. The method 200 then receives 202 additional input related to the notification element. As will be described below, any one of the user interfaces shown and described below with reference to FIGS. 5A-9 may be presented to the user. Input by the user in any one of these different contexts may be sent to the notification surfacing module 1003. Next, the method 200 determines 204 the type of input received in block 202. Depending on upon the notification that was being presented, and the specific input of the user, a type of input may be determined. For example, the types may include a request to view will post; a request to show what's nearby, a request to share location; a request to confirm that the user is leaving the place; a request to perform an action on the social network; a request to perform an action on a device or third-party system; a request to show people nearby; and a request for another type of update, etc. The method 200 continues by processing the input. Processing the input may include performing one of the types of actions described and generating an update to the notification element. In block 206, the method 200 performs the action associated with the type of input. Then the method 200 continues to determine 208 whether the notification element needs to be updated. If so, the notification element is updated 210. For example, the user interface may be updated by transitioning from the interface shown in FIG. 5A to another interface shown for example in FIGS. 6-9. If it was determined in block 208 that the notification element does not need to be updated, the method 200 proceeds from block 208 to block 212. In block 212, the method 200 determines whether the input was to close the notification element. If not, the method 200 returns to step 202 to receive additional input and allow the user to further interact with the updated notification interface element. However, if it was determined in block 212 that the input and instruction to close the notification element then the method 200 closes 214 the user interface element.

Figure 3A:
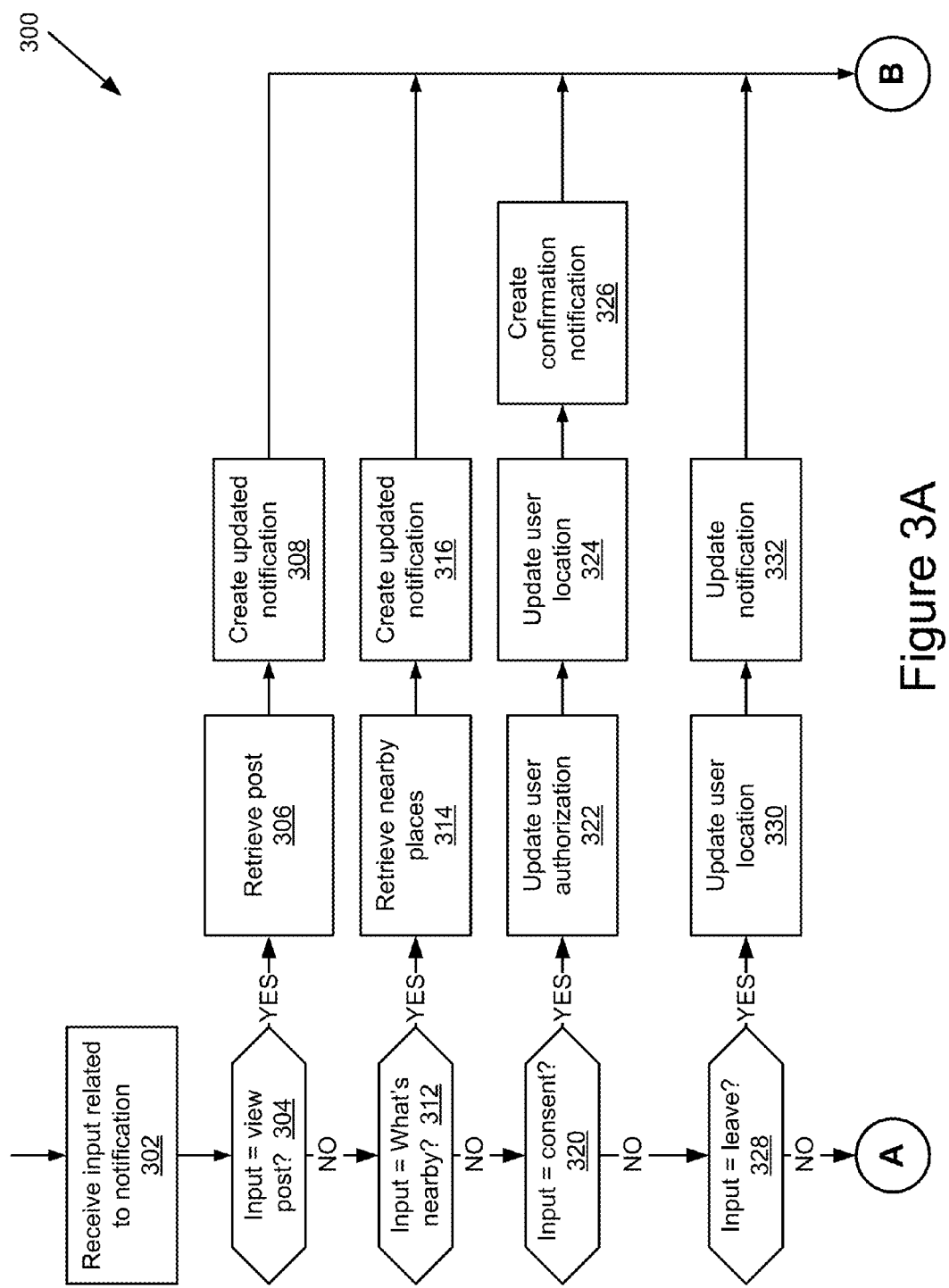
FIGS. 3A and 3B are a flow chart illustrating another example method for interacting with a surfaced real-time notification.
Figure 3B:
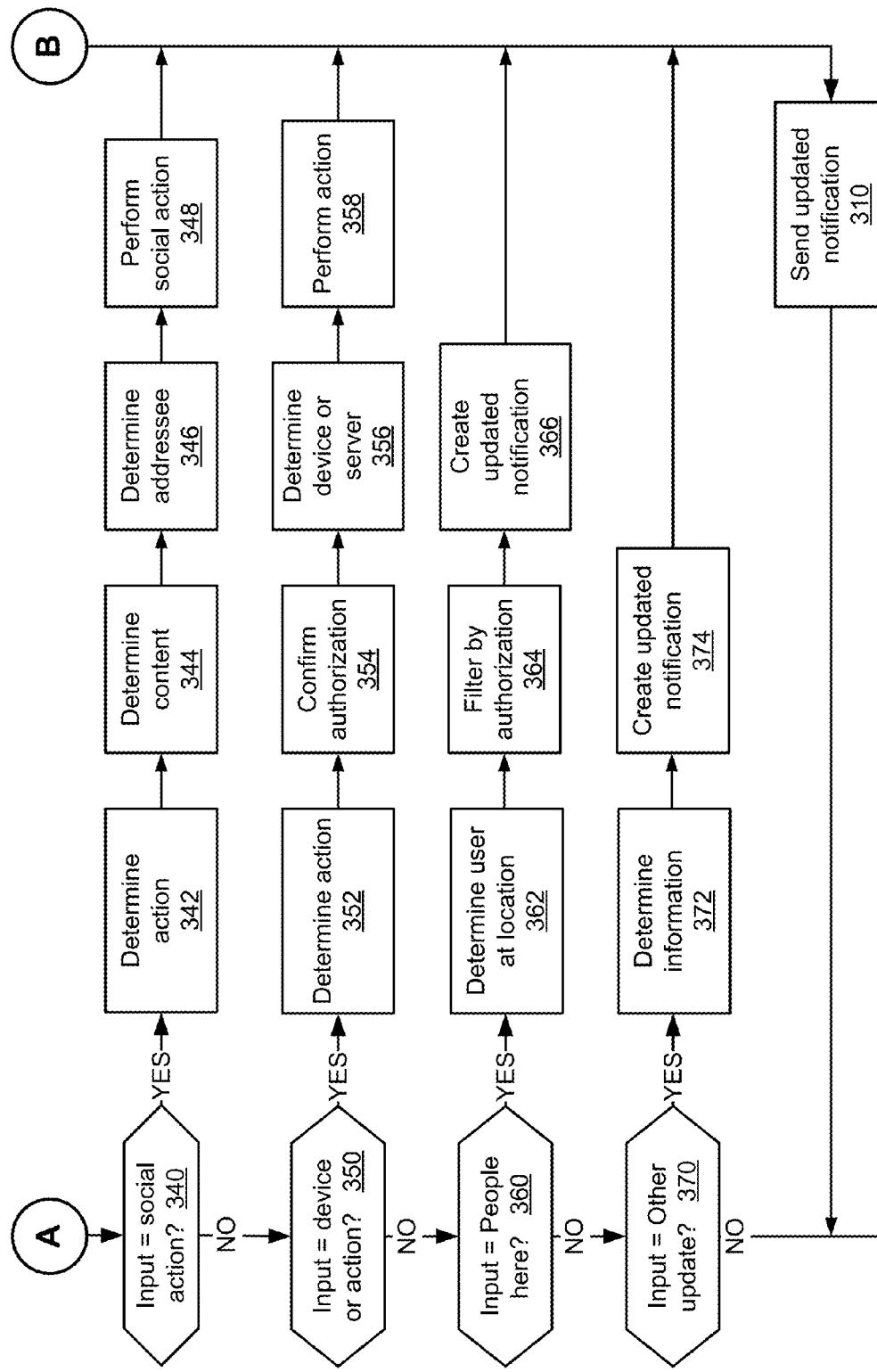

Referring now to FIGS. 3A and 3B, another implementation of a method 300 for interacting with a surfaced real-time notification will be described. Again, before the method 300 of FIG. 3 begins, the method 100 of FIG. 1 has been performed to generate a surface notification based on user location and identity. Example notifications 500, 520, 530, 540 are depicted and described below with reference to FIGS. 5A-5D. As shown in FIG. 3A, the method 300 begins by receiving 302 input related to a notification element. For example, the input may be a selection of a button of the notification, the inputting of text, the selection of a comment in the notification element, the addition of photos, the addition of gestures, marks or other interaction with the display, the input of a command to store, the selection of an icon in the notification element indicating show a post, what's nearby or inputting a consent, the detection of a location changes, or related comments, etc.

The method 300 continues by determining 304 whether the received input was a request to view a post. If so, the method 300 continues to retrieve 306 the post and create 308 an updated notification. For example, the notification shown in FIG. 5A may be updated, a post corresponding to the notification retrieved, and an updated notification similar to that shown in FIG. 6 created. Referring now also to FIG. 3B, the method 300 continues by sending 310 or providing the updated notification. In some implementations, the notifications can be closed in response to input from the user. The notifications may also automatically disappear after a predetermined amount of time.

If the input from the user was determined not be a request to view a post in block 603, the method 300 continues to block 312 to determine whether the input was a request to view what's nearby. If so, the method 300 updates the user's location and determines a place corresponding to the user. Then the method 300 retrieves 314 nearby places and creates a map reflecting the orientation of the nearby places to the user's location or place. In some implementations, the map may also include people in addition to places. For both places and people, the method 300 advantageously filters the information that is included on the map based upon social signals or information received from the social network application 1009 using the identification of the user. The method 300 creates 316 an updated notification from the map. An example of this process is shown by the transition from the notification of FIG. 5A to the notification of FIG. 7A. The user may interact with the updated notification of FIG. 7A to transition it from the collapsed view of FIG. 7A with no additional locations and information shown to the expanded view of FIG. 7B that shows more information about particular places. Referring now also to FIG. 3B, the method 300 continues by sending 310 or providing the updated notification.

If the input from the user was determined not to be a request for what's nearby in block 312, the method 300 continues to block 320 to determine whether the input was a consent for use of location information of the user as may be provided by a smart phone or other portable device. For example, a solicitation notification (e.g., FIG. 9) may be sent to the user indicating that if the user provides authorization to use her location information, relevant and valuable notifications may be provided in return. In response to the solicitation notification, the user may input their consent in block 302. If the input was determined to be a consent, the method 300 updates 322 the user authorization information and determines or updates 324 for the location of the user. The surface notification module 1003 may also be updated so that the user can now be identified by others when they have co-presence or are located nearby each other. Then the method creates 326 the confirmation notification (not pictured) indicating to the user that their location is visible and will be used to surface information related to their location and that they will be visible to others in their social network. Referring now also to FIG. 3B, the method 300 continues by sending 310 or providing the updated notification.

If the input from the user was determined in block 320 not to be a consent, the method 300 continues to block 328 to determine whether the input was that the user is leaving the current location. If so, the method 300 updates 330 the user's location to indicate that they are leaving or are no longer at a place. This is particularly advantageous because it allows the overall system to provide real-time information about the presence or proximity of other users to their friends, colleagues or other people they may be interested in engaging with in person. Then the method 300 creates 332 an updated notification to indicate that a particular individual has left. For example several people are together in at a conference, a first user may indicate that they are leaving and that notification can be broadcast to other users who have a connection to the first user that are at the conference. This is especially advantageous if people who are not yet at the conference received the location information because they have an ability to modify their plans based on more current information and may decide not to join the conference because the fuel first user is no longer there. Referring now also to FIG. 3B, the method 300 continues by sending 310 or providing the updated notification.

Referring now also to FIG. 3B, if the input from the user was determined not to be that the user is leaving the current location in block 328, the method 300 continues to block 340 to determine whether the input was a request to perform an action on a social network. For example, the notifications in FIGS. 5A-5D may include any number of buttons to perform actions on a social network. If the user interacts with the notification to indicate that she would like to perform a social action, an updated notification is provided to the user. For example, if the user indicates that she would like to share a picture, the notification can transition from that of FIGS. 5A-5D to that of FIG. 8. The method 300 continues by determining 342 the action to be performed. For example, the action could be to create a new post, to share a photo, to re-share a post, to make an endorsement, or any other action possible on the social network. The method 300 then determines 344 the content for the action and determines 346 the addressees, if any for the action. Next the method performs 348 the action. For example, the social network interface module 1208 allows the network surfacing module 1003 to receive input from notifications and send them to implement actions on a social network application 1009. Then the method 300 creates a confirmation notification (not pictured) and sends 310 or provides the updated notification.

If the input from the user was determined not to be a request to perform an action on a social network in block 340, the method 300 continues to block 350 to determine whether the input was a request to perform an action by a device or third-party system. For example, from a notification, a user is able to interact with physical devices to perform tasks (e.g. unlocking doors, turning devices on or off, modifying the settings of devices, etc.). From a notification a user is also able to control or interact with third-party systems to perform actions or conduct transactions. The method 300 continues by determining 352 the action to be performed. The method 300 then confirm 354 that the user has authorization to interact with the device and perform the desired action or interact with the third-party system and perform the transaction. The notification surfacing module 1003 advantageously uses the identification of the user to confirm authorization. For example the user identity module 1204 of the notification surfacing module 1003 can be used to perform these tasks. Next the method 300 determines 356 the device or third party server 1007 with which the user wants to interact and initializes communication. Then the notification surfacing module 1003 performs 358 the action requested by the user. Then the method 300 creates a confirmation notification (not pictured) and sends 310 or providing the updated notification.

If the input from the user was determined not to be a request to perform an action by a device or third-party system in block 350, the method 300 continues to block 360 to determine whether the input was a request to identify people nearby. If so, the method 300 uses the current location of the user and determines 362 others users near that location. Next, the method 300 retrieves information from the social network application 1009 and uses that information to filter other users near the location based on authorizations that the requesting user's has as well as by strength of relationship to the user. In some implementations, the identified users near the location are placed in rank order by relevance and strength the relationship to the requesting user. Those users above a predetermined threshold are selected for inclusion in the notification. Next the method 300 creates 366 an updated notification including the people selected in block 364 for inclusion. The notification may be a list of people nearby. In some implementations, markers with names of people may be placed on a map to provide their relative position to the current user. Then the method 300 sends 310 or provides the updated notification.

If the input from the user was determined not to be a request to identify people nearby in block 360, the method 300 continues to block 370 to determine whether the input was a request for any other update, information or action. If so, the method 300 to determines 372 the information necessary and creates 374 an updated notification. Then the method 300 sends 310 or provides the updated notification.

Figure 4:
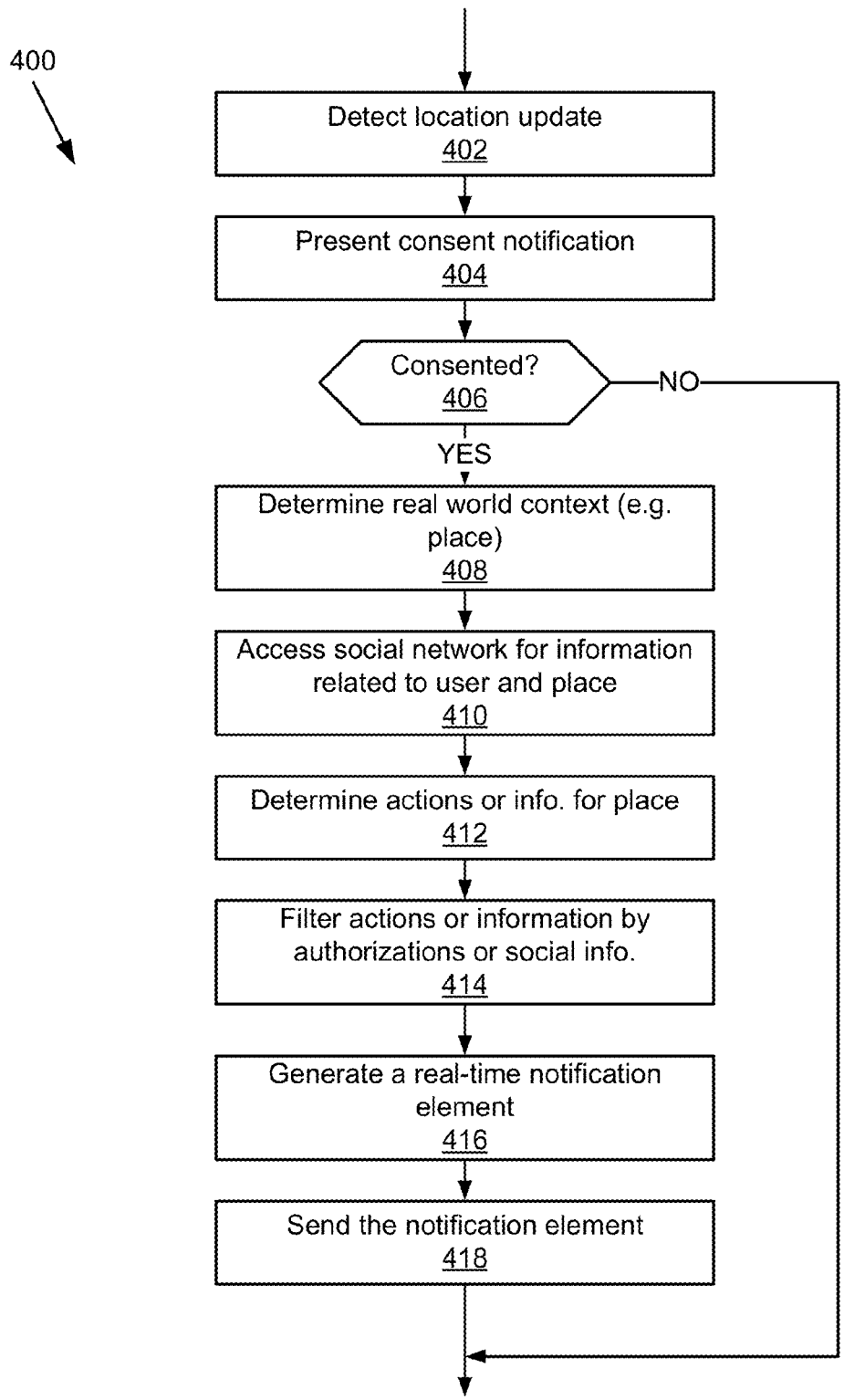
FIG. 4 is a flow chart of an example method for determining location and generating a real-time notification.
Figure 9:
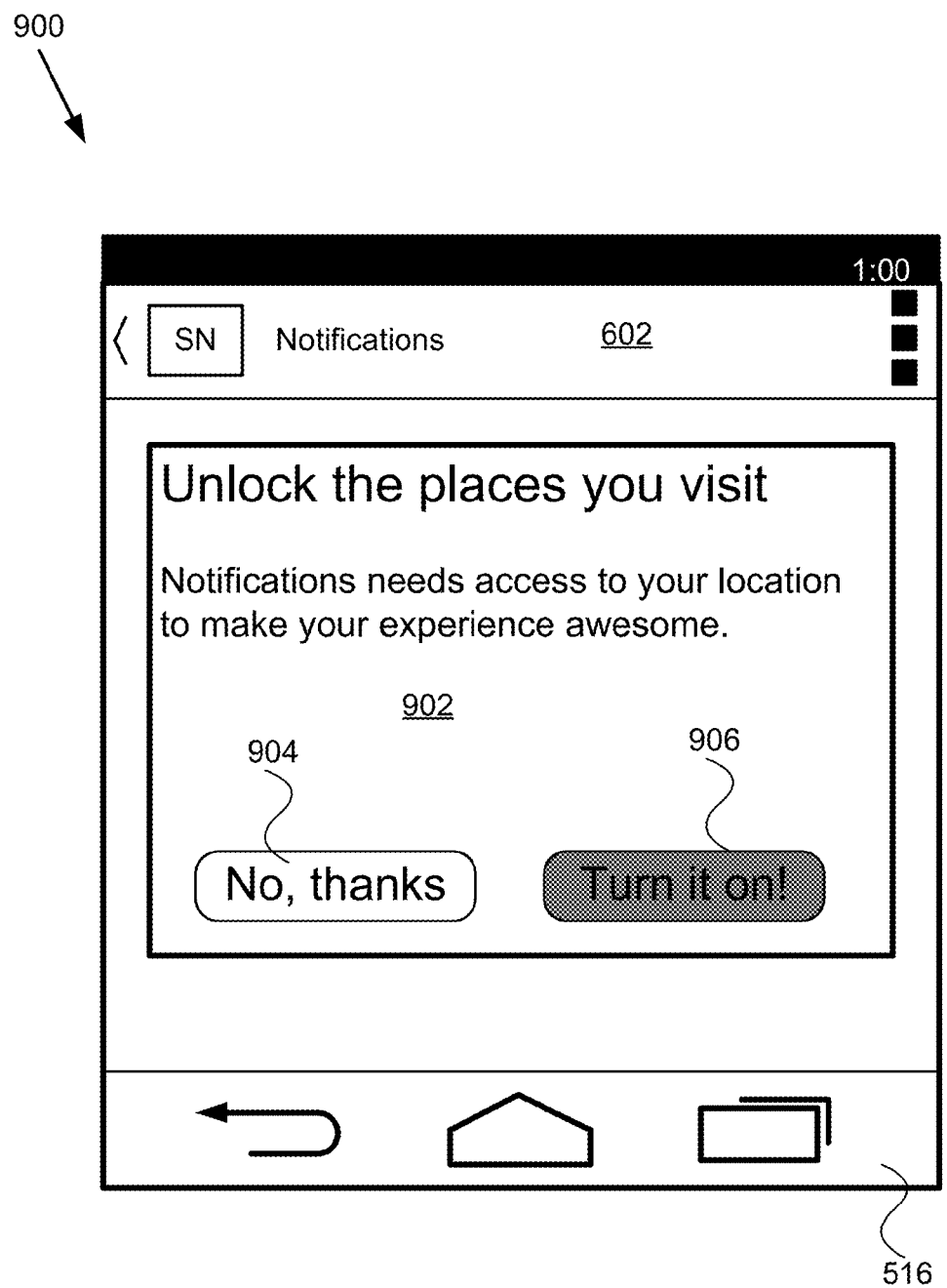

Referring now to FIG. 4, an example method 400 for determining location and generating a real-time notification will be described. The method begins by detecting 402 a location update. One particular advantage of the present disclosure is that the notification surfacing module 1003 can provide real-time notifications of people, activities, and other events that are relevant to a particular user based on their location. As location of the user is modified, the notification surfacing module 1003 retrieves and computes information for notifications. If the information is above a particular threshold then that information is presented to the user in a notification. For example, location updates may be provided by the smart phone of a particular user. The location update may be sent from the smart phone (client device 1015) to the notification surfacing module 1003. Next, the method 400 presents 404 a consent notification. An example consent notification is shown in FIG. 9. The notification surfacing module 1003 receives the user's input and if the user did not consent, the method 400 is complete and ends. On the other hand, if the user did consent, the method 400 continues to block 408. It should be understood that once the user has consented, block 404 and 406 can be omitted from the real time notification process. The method 400 continues by determining 408 a real world context. This can be as simple as determining a place associated with location or he can be more complex including determining how frequently the user visits a place, when the last visited the place, where other users are relative to that place or various other information that reflects user intention and their relationship with the real world. Next, the method 400 accesses 410 the social network for information related to the place and the user, determines 412 actions or information for the place, and filters 414 the actions or information by authorizations or other social information. The steps are similar to those described above with reference to FIG. 1. Next the method 400 generate 416 a real-time notification element, and sends 418 the notification to the user.

Figure 5A:
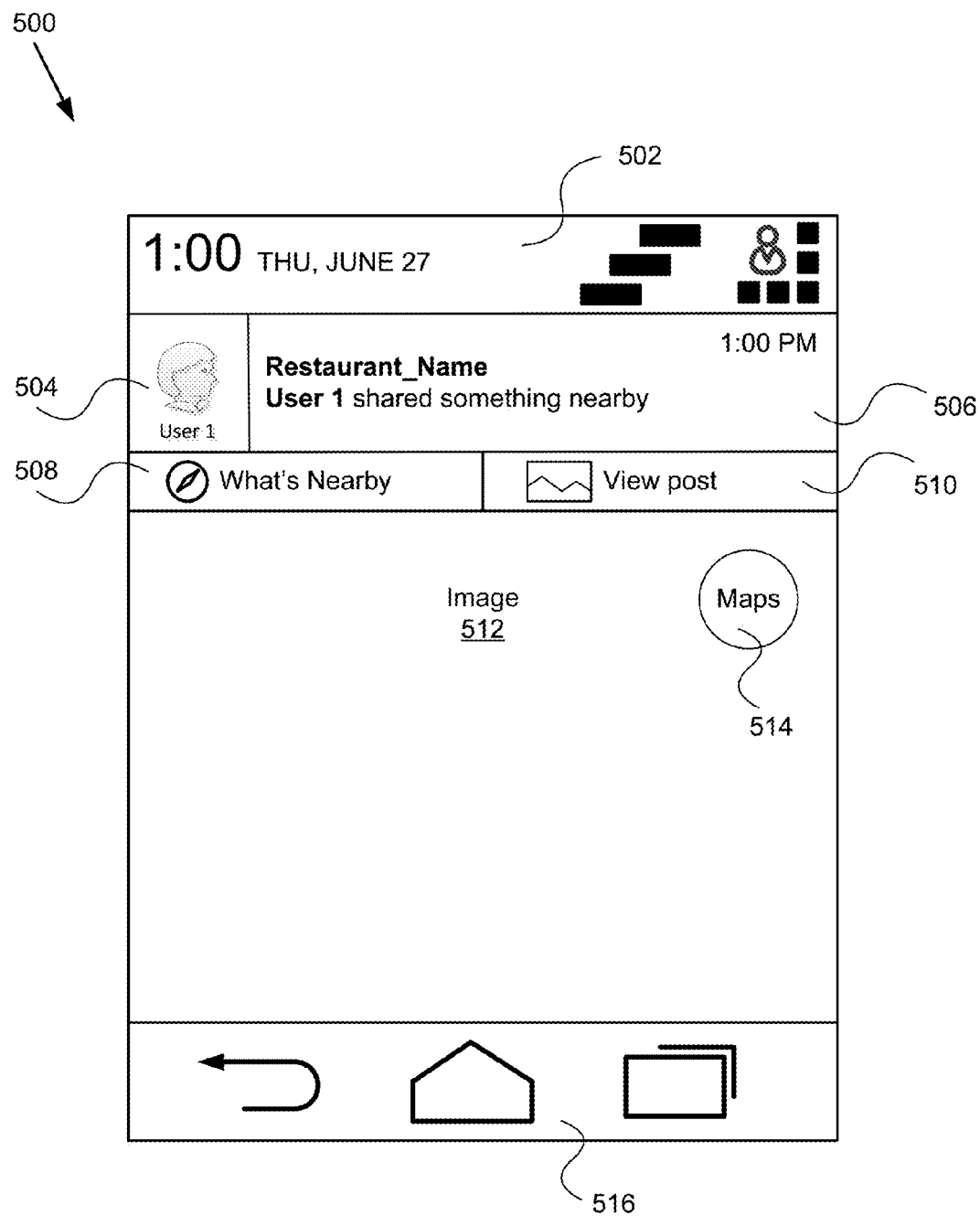
FIGS. 5A-9 are graphic representations of example user interfaces for surfacing real-time notifications and interacting with them according to some implementations of the present disclosure.

Referring now to FIGS. 5A-9, various implementations of the notification element on an example screen of smart phone will be described. In particular, FIGS. 5A-5C show example notification messages 500, 520, 530 and 540. The notification surfacing module 1003 processes the user information including location, identity and relationships and based on a particular location may surface an introductory notification, including the examples presented in FIGS. 5A-5C.

FIG. 5A shows an example notification element 500 for display on a smart phone. Throughout the description that follows the terms notification and notification element will be used interchangeably for convenience and ease of understanding. FIG. 5A is a graphical representation of the display of the smart phone. The notification 500 includes a header 502 with time, date, status indicators and other icons for navigating or performing other actions. The notification 500 also includes information 506 forming the notification. In this example, the notification is about a nearby restaurant called "Restaurant_Name" and the fact that a user, User 1, shared something nearby. The notification 500 also includes an image or icon 504 used by User 1 as his identifier on the social network application 1009. For this example notification 500, a pair of buttons 508, 510 are included to transition to other notifications that allow the user to view what's nearby or view the full post, respectively. The notification 500 also includes an image 512 associated with Restaurant_Name. Positioned over a portion of the image 512 is a button or link 514 that allows the user to transition to a notification (not pictured) that shows the location of the Restaurant_Name on a map. Finally, the notification element 500 includes a footer having a series of buttons that are selectable to perform various actions.

Figure 5B:
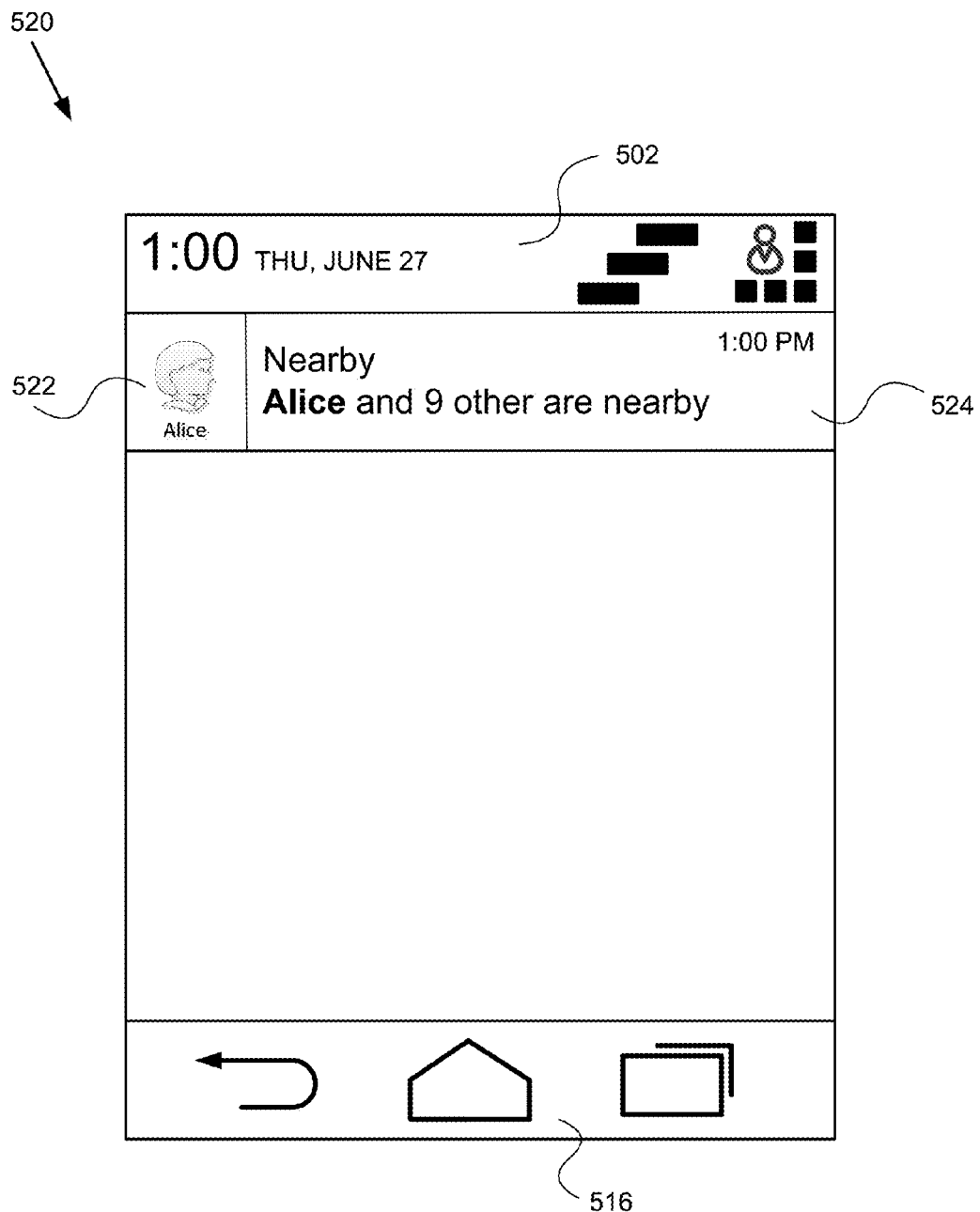

FIG. 5B shows another example notification element 520. This example notification element 520 has a very basic form. The notification element 520 includes the header 502 and footer 516 similar to that described above with reference to FIG. 5A. The notification 520 includes a simple message 524 that a user, the notification "Alice," and nine others are nearby the present location of the user. The notification 520 also includes an icon or image 522 representing Alice.

Figure 5C:
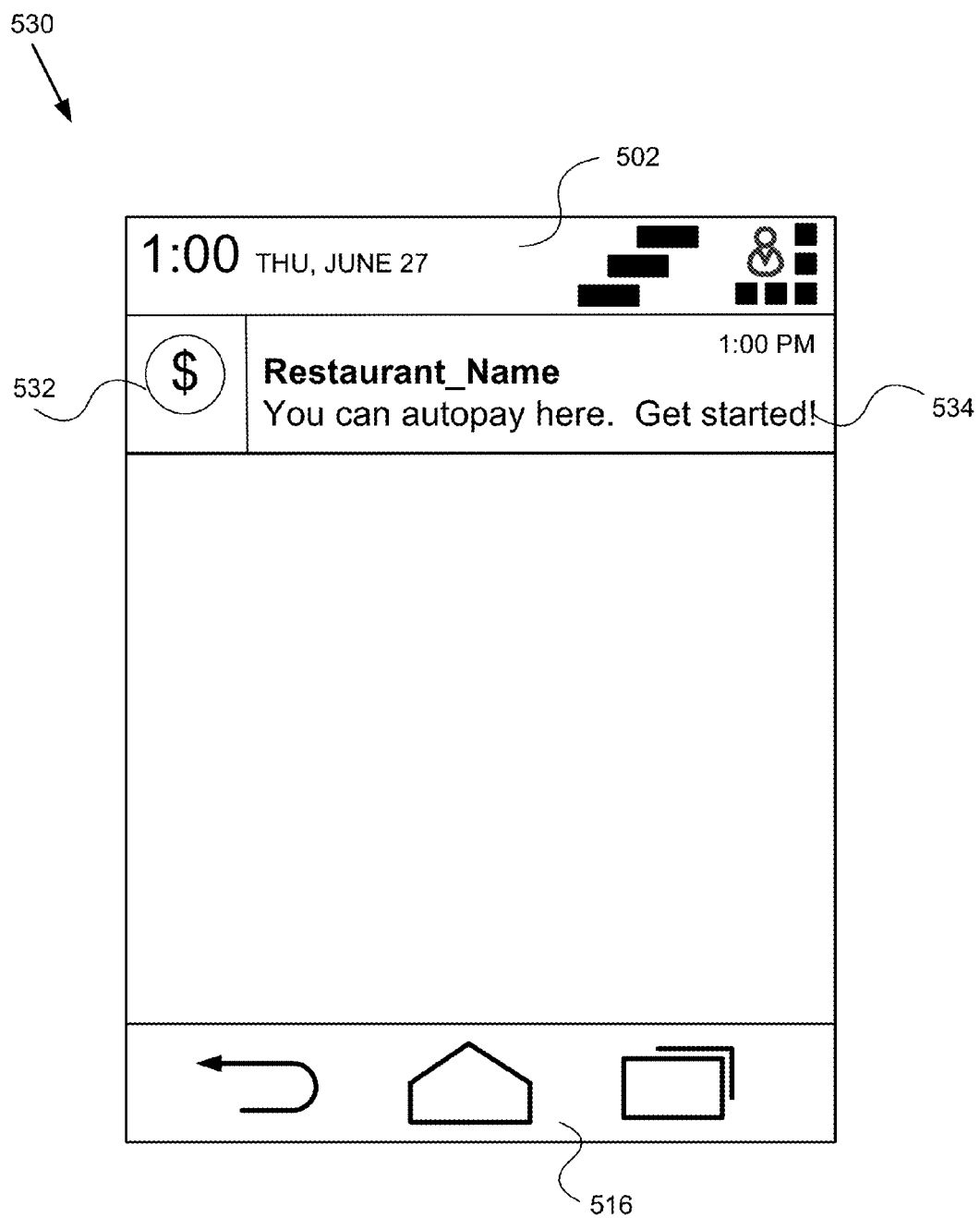

FIG. 5C is another example notification 530. This is an example notification 530 that can be auto generated by the notification surfacing module 1003 to notify the user that they can use an electronic payment system via their smart phone to pay for any meals at the restaurant in which they are located. In this case, the user is at Restaurant_Name. Sometime during their visit to Restaurant_Name, the notification surfacing module 1003 generates and sends the example notification 530. The notification 530 includes a header 502 in a footer 516 similar to the other notifications 500, 520 described above. The notification 530 also includes a message 534 indicating the restaurant's name, Restaurant_Name, and text indicating auto pay can be used here. The notification 530 also includes a button 532 selectable by the user to transition to transaction screens to affect payment via auto pay.

Figure 5D:
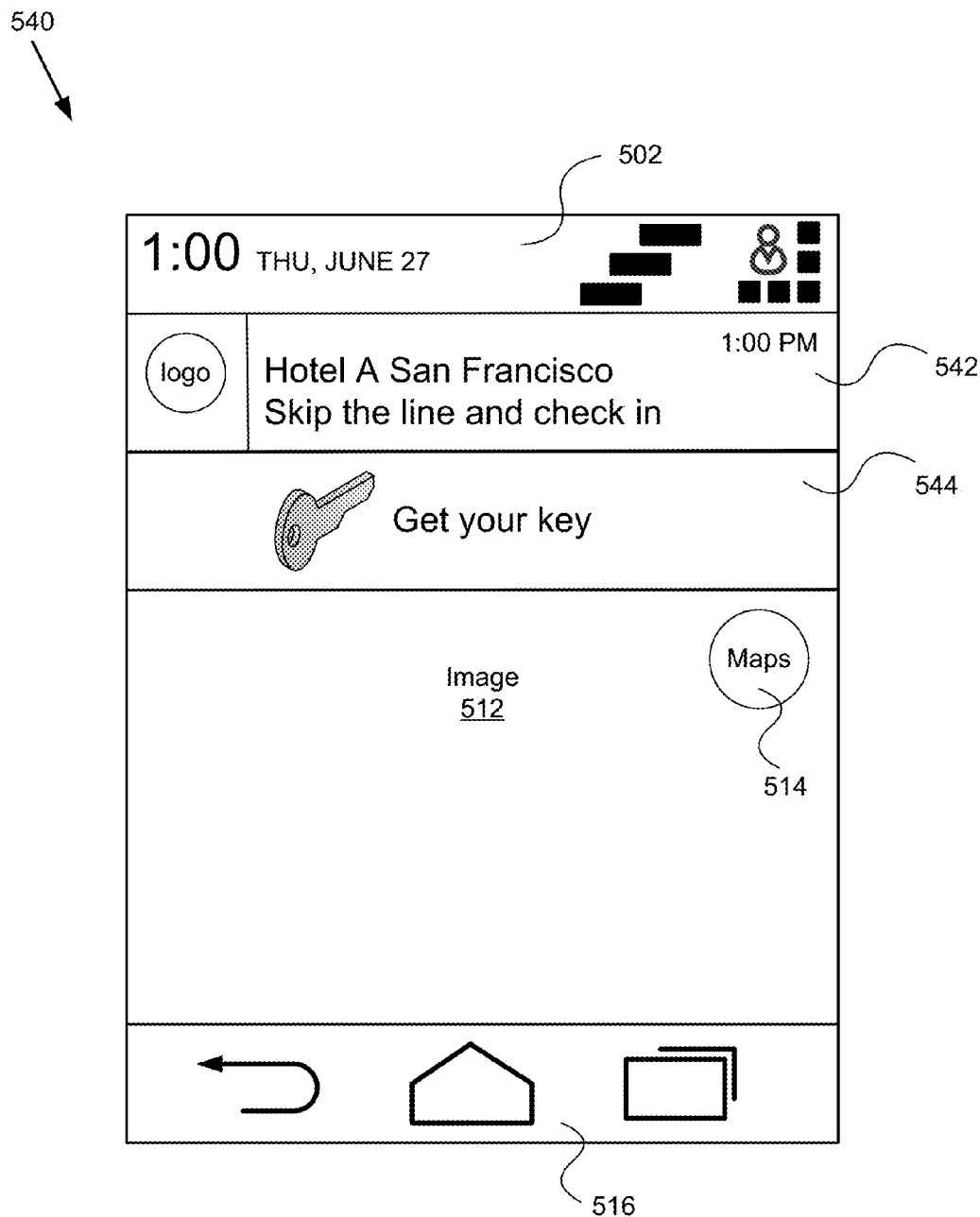

FIG. 5D is yet another example of the notification 540. Again, this notification 540 includes a header 502 and a footer 516 similar to the other notifications. The notification 540 may also include an image 512 representing a hotel and a map button 514 to transition to a map showing location of the hotel. Located proximate the header 502, this notification 540 includes a message 542 with a logo of the hotel, a time, and an indication that "Hotel A" in San Francisco allows the user to use their mobile device to check-in to the hotel. The notification also includes a selectable button 544 that allows the user to transition to transactions that will allow the user to check into the hotel and obtain a room assignment and the key to the room. This example notification 540 may be presented to a user just after they land at the airport on and air flight to San Francisco. Or the system 1000 may present this notification 540 with knowledge from the social network that the user has a reservation at this hotel. Similarly, this notification may be presented to the user as they come within a predetermined distance of the hotel.

Figure 6:
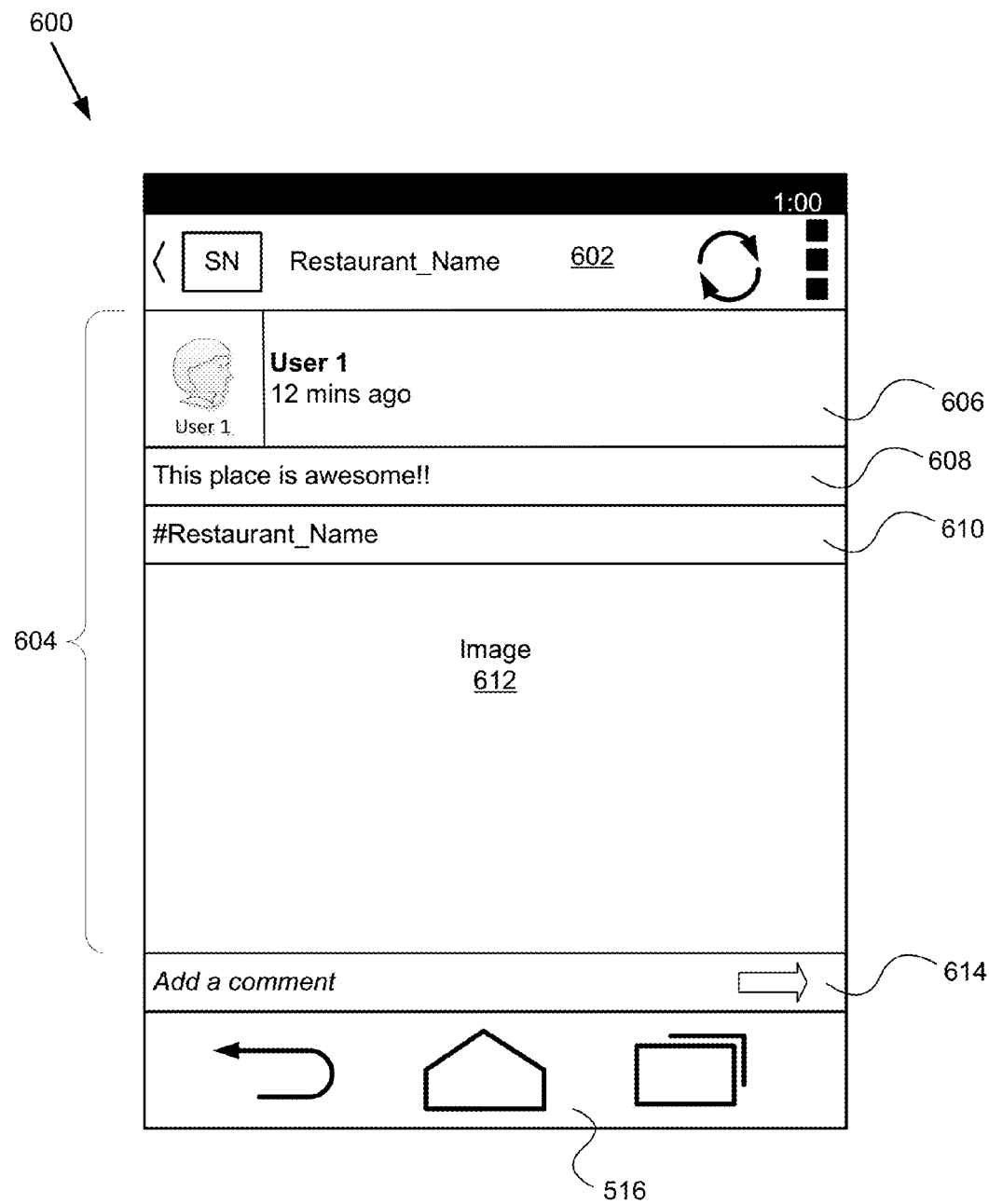

Referring now to FIG. 6, a notification 600 that includes a post 604 from a social network is shown. For example, in response to selection of the view post button 510 of notification 500 shown in FIG. 5A, the notification surfacing module 1003 will transition to the notification 600 shown in FIG. 6. The notification 600 includes a header 602 and the footer 516. The header 602 is slightly different in that it provides navigation button, an indication of the social network from which the post 604 has been retrieved, and slightly different navigation buttons and information. The post 604 includes an image of the author or an icon representing the author, the name of the author and a time of the post—in this case 12 minutes ago 606. The post 604 also includes the post text 608, a link 610 to the place related to the post, and an image 612 that is part of the post. The notification 600 also includes a box and button 614 for adding comments and re-sharing the post.

Figure 7A:
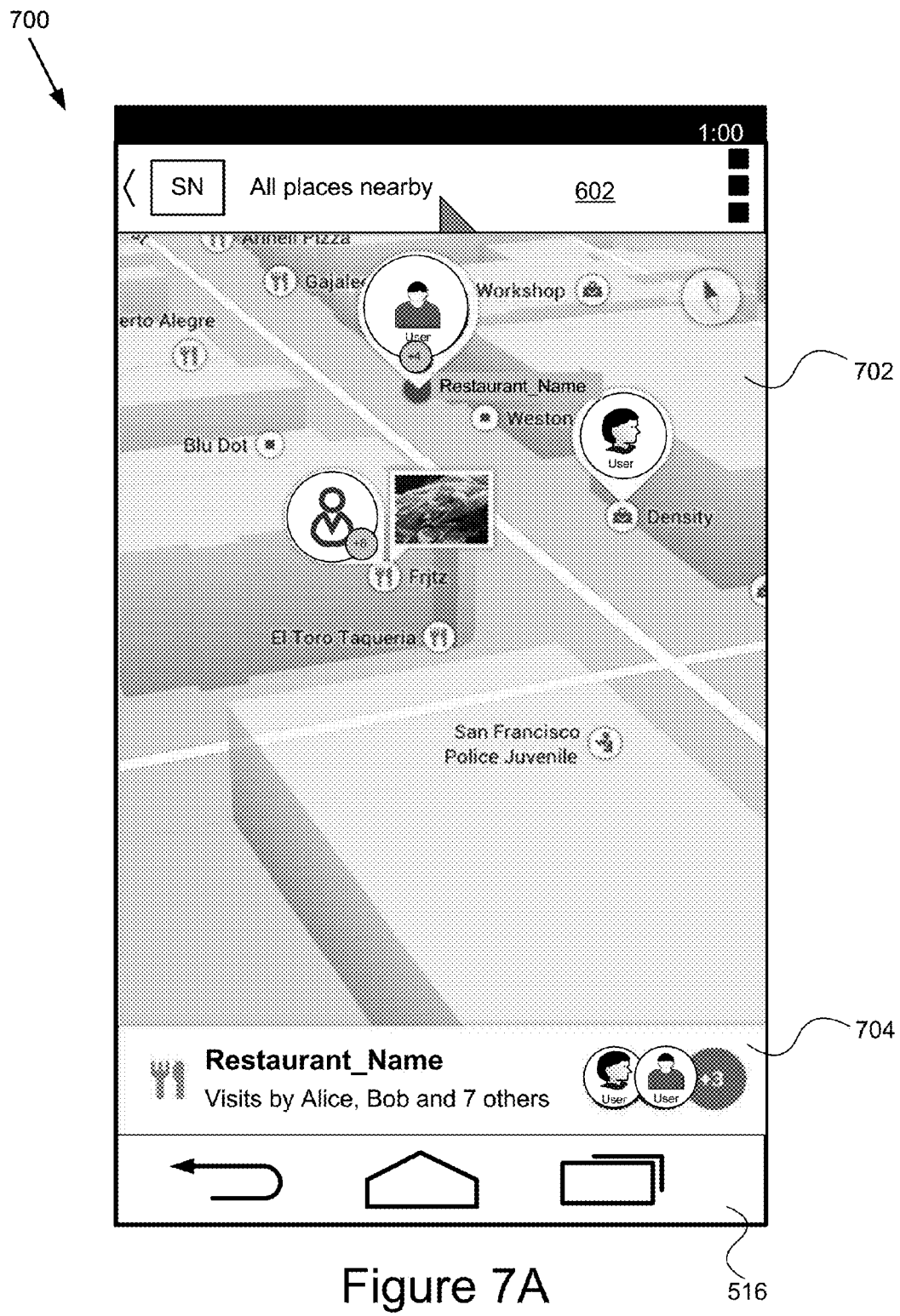
Figure 7B:
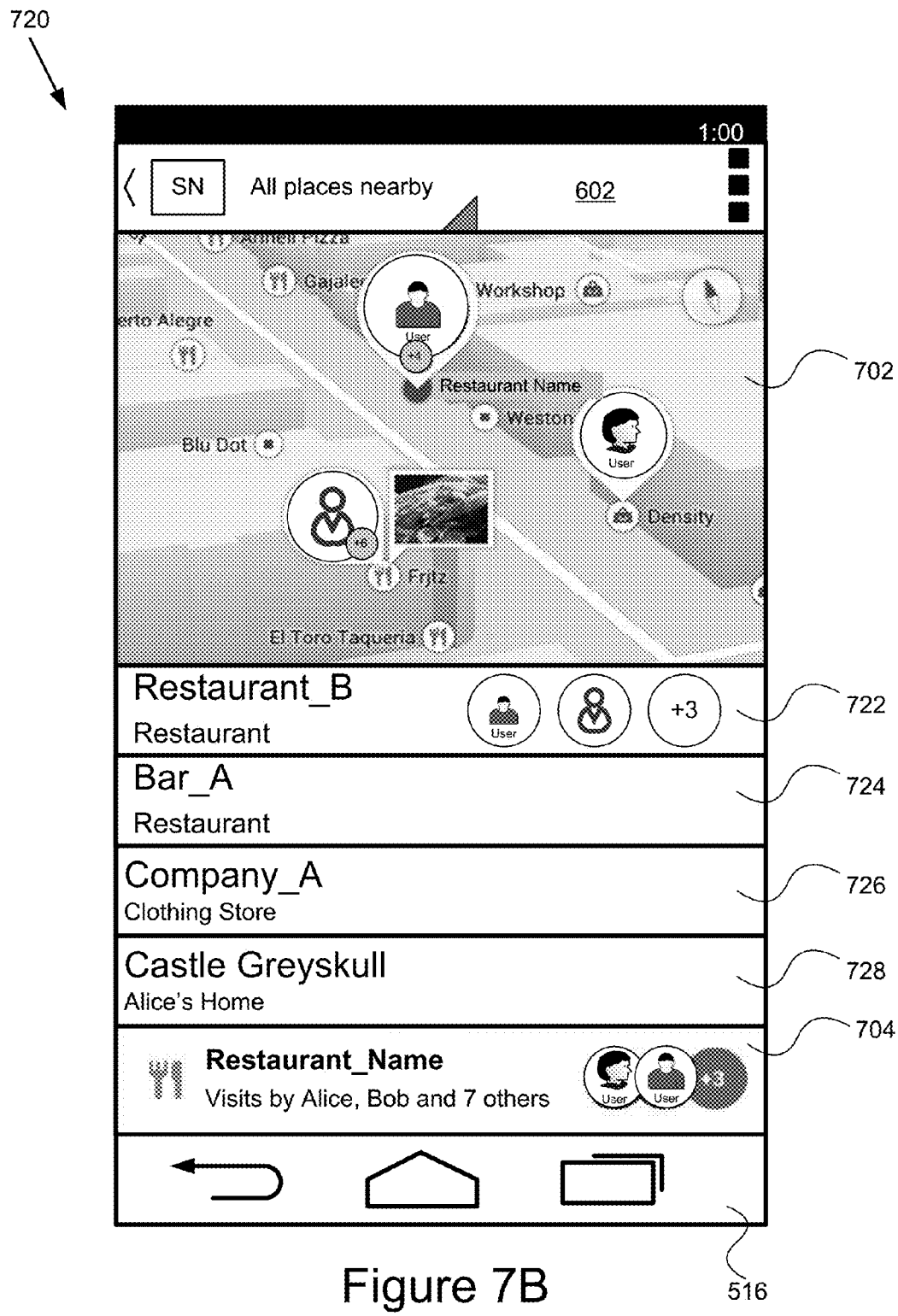

Referring now to FIGS. 7A and 7B, notifications 700, 720 that include a description of nearby places relative to the location of the user is shown. For example, in response to selection of the "What's nearby" button 508 of notification 500 shown in FIG. 5A, the notification surfacing module 1003 will transition to either the notification 700 shown in FIG. 7A or the notification 720 shown in FIG. 7B. FIG. 7A is a graphical representation of a notification 700 that presents a collapsed view of nearby places. The notification 700 includes a header 602 and a footer 516 as has been described above. The header 602 may also include a toggle button to toggle between the collapsed view of FIG. 7A and the expanded view of FIG. 7B. The notification 700 includes a map 702 of places nearby. The map 702 may indicate the location of the user, the location of other users within the social network of the user and their locations and concentrations in locations nearby. The notification 700 also provides an information box 704 that indicates the location of the user, others that have visited the location, the place associated with the location (e.g., Restaurant_Name) and icons representing some of the other users that are presently at the place and a total number of others. It should be understood that the information box 704 may include other information from the social network or information generated by the real world contexts, for example the history of the user with a particular place or the activities of other users connected to this user and their activities with regard to the place. FIG. 7B is a graphical representation of a notification 720 that presents an expanded view of nearby places. Similar to the notification 700 described above with reference to FIG. 7A, the notification 720 includes a header 602 a map 702, an information box 704 and the footer 516. As shown by the example in FIG. 7B, the notification 720 includes a list of nearby places. For each of the nearby places in the list, an information box 722, 724, 726 and 728 is provided. The information boxes 722, 724, 726 and 728 include a name or shorthand for the place, a description or category of the type of place, and an indication of other users with a relationship to the user that may be located at that place. Many of the operations of the notification surfacing module 1003 are performed in real time. Thus, the list of places and people at those places are modified from time to time as people within the user's social network arrive and leave from various locations. This is particularly advantageous because the notification provides the user with a live reflection of what is transpiring at places in the real world.

Figure 8:
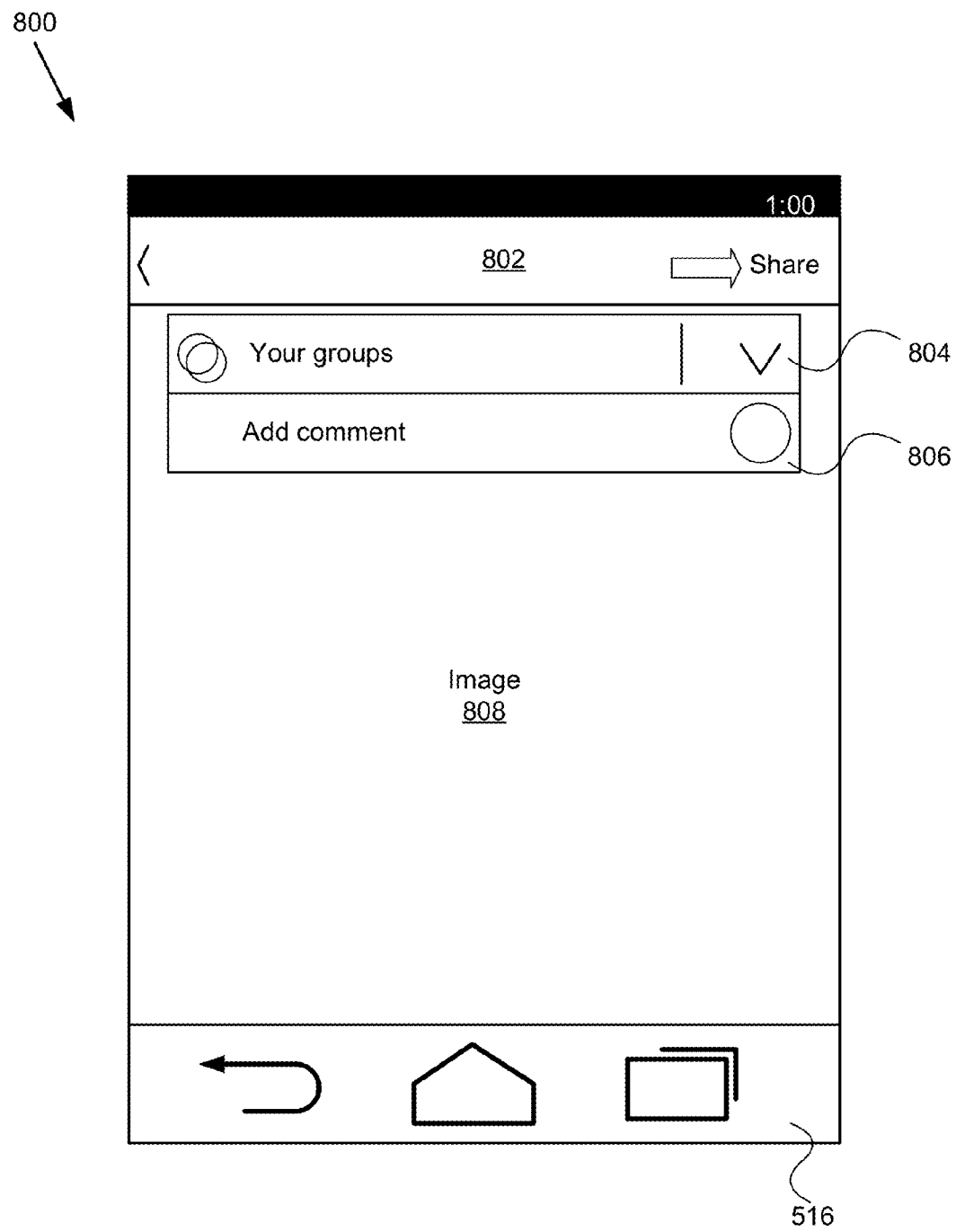

FIG. 8 is a graphical representation of a notification 800 for performing an action on a social network. In this example, the user has decided to capture an image and share it as part of the post. The notification 800 includes a header 802 and the footer 516. The header 802 has the share button as well as the navigation button. The footer 516 is similar as to that described with regard to other notifications. The notification 800 also includes a box 804 for selecting addressees of the post and a comment box 806 for adding text to be included with the post. The notification includes an image 808 that will be included as part of the post. Thus, using this notification 800, the user can quickly and easily perform actions on the social network that relate to a particular location. Performing such actions will associate them with the location or place and can be used to create a place history or timeline of places visited.

FIG. 9 shows a graphical representation of a notification 900 for providing consent to use the location information of the user. The notification 900 includes a header 602 and a footer 516 similar to that of FIG. 8. The notification also includes a consent information box 902 that requests the user's consent to use the location information. Within the information box 902, a pair of buttons 904, 906 are provided for rejecting consent or providing consent. This notification illustrates how the various different approvals can be presented to the user. While the notification is used to gain consent of the user to use his location information, it should be understood that a similar type notification can be used to get the user's approval for a variety of different transactions, actions or other consents.

Figure 10:
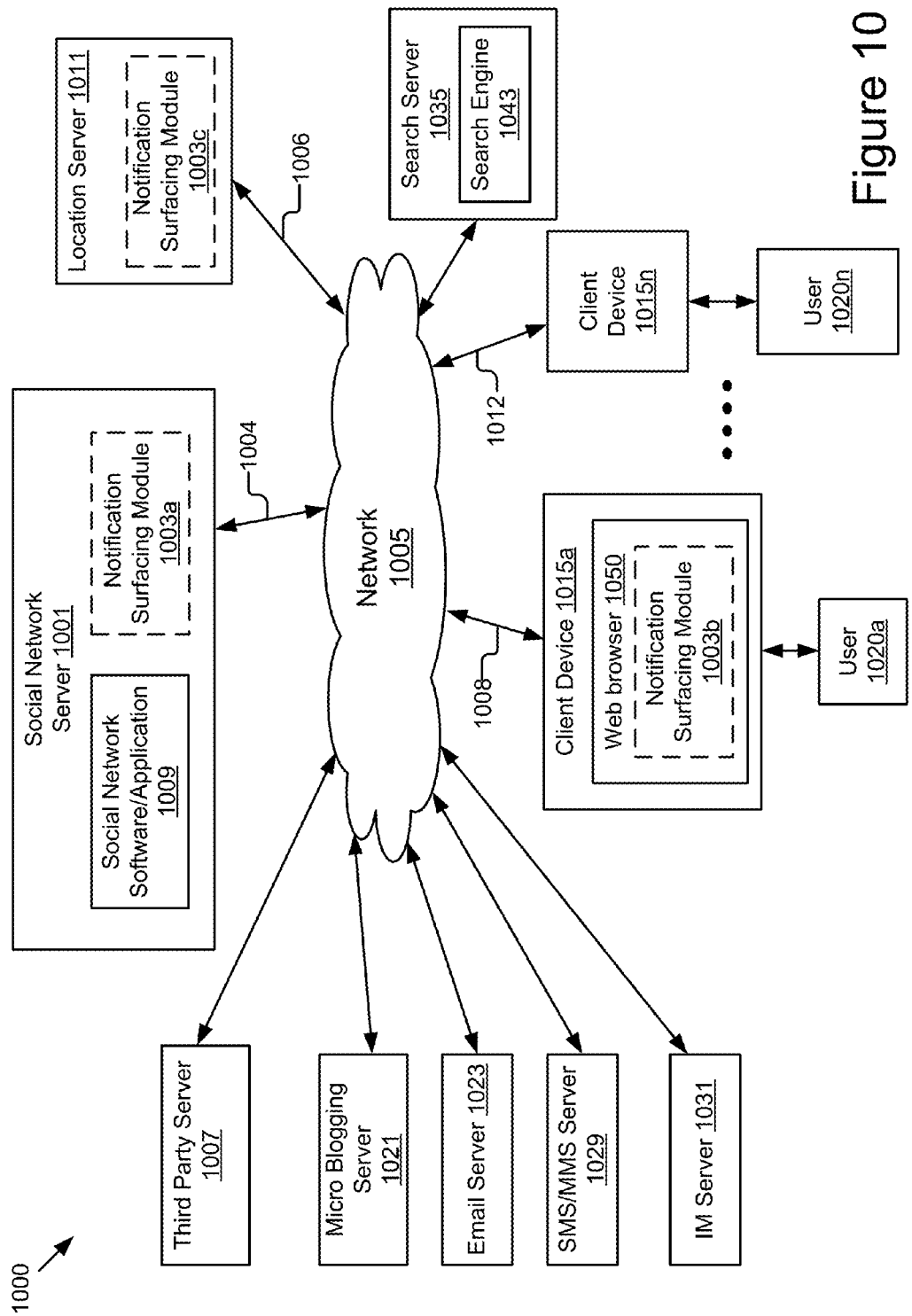
FIG. 10 is a high-level block diagram illustrating an example system for surfacing real-time notifications based on location.

FIG. 10 illustrates a high-level block diagram of a system 1000 for surfacing real-time notifications based on location according to some implementations of the present disclosure. The illustrated system 1000 includes client devices 1015a-1015n (also referred to herein individually and collectively as 1015) that are accessed by users 120a-120n (also referred to herein individually and collectively as 1020), a social network server 1001 having a social network application 1009 and a notification surfacing module 1003a (also referred to herein individually and collectively as 1003). The system 1000 also includes a number of products or services offered by a third party server 1007, a location server 1011, a micro blogging server 1021, an email server 1023, a Short Message Service (SMS)/Multimedia Messaging Service (MMS) server 1029, an Instant Messaging (IM) server 1031 and a search server 1035. In the illustrated implementation, these entities are communicatively coupled via a network 1005. These systems 1001, 1007, 1011, 1021, 1023, 1029, 1031 and 1035 are merely examples and the system 1000 in some implementations includes an advertisement server, a document server, a blogging server, a news feed server, a video sharing server, a photo sharing server, a map server and any other third party server, etc.

The client devices 1015a-1015n in FIG. 10 are used by way of example. While FIG. 10 illustrates two client devices 1015a and 1015n, the present disclosure applies to any system architecture having one or more client devices 1015. Furthermore, while only one network 1005 is coupled to the client devices 1015a-1015n, the social network server 1001, the third party server 1007, the location server 1011, the micro blogging server 1021, the email server 1023, the Short Message Service (SMS)/Multimedia Messaging Service (MMS) server 1029, the Instant Messaging (IM) server 1031 and the search server 1035, in practice one or more networks 1005 can be connected to these entities. Furthermore, while only one the third party server 1007 is shown, the system 1000 can include one or more the third party servers 1007. Furthermore, while only one social network server 1001 is shown, the system 1000 can include one or more social network servers 1001.

While shown as operational on the social network server 1001 in FIG. 10, in some implementations all or part of the notification surfacing module 1003*a*, 1003*b*, 103*c* may be operational on the one or more of the client devices 1015, the third party server 1007 or the location server. The notification surfacing module 1003 interacts with the servers 1001, 1007 and 1011, via network 1005. The notification surfacing module 1003 is also coupled for communication with the client device 1015*a*, which is connected to the network 1005 via signal line 1008. The user 120*a* interacts with the client device 1015*a*. Similarly, the client device 1015*n* is coupled to the network 1005 via signal line 1012 and the user 120*n* interacts with the client device 1015*n*. The user 1020*n* is a human user of the client device 1015. It should be recognized that the notification surfacing module 1003 can be stored in any combination of the devices and servers, or in only one of the devices or servers. The notification surfacing module 1003 is described in more detail with reference to FIGS. 1-4, 11, and 12.

The social network server 1001 is coupled to the network 1005 via signal line 1004 for communication and cooperation with the other components of the system 1000. In some implementations, the social network server 1001 includes the social network software/application 1009. Although only one social network server 1001 is shown, it should be recognized that multiple servers may be present. A social network may be any type of social structure where the users 1020*n* are connected by a common feature. The common feature includes relationships/connections, e.g., friendship, family, work, an interest, etc. The common features are provided by one or more social networking systems, for example, those included in the system 1000, including explicitly-defined relationships and relationships implied by social connections with other online users, where the relationships form a social graph. In some examples, the social graph can reflect a mapping of these users and how they are related. The phrase social graph as used herein encompasses its plain and ordinary meaning including, but not limited to, a file that includes the relationships between the users in a social network. For example, users can be friends, acquaintances, have business relationships, one user can follow another user, one user can subscribe to another user, share with other users or a specific user, etc. Furthermore, it should be understood that the social network server 1001 and the social network software/application 1009 are representative of one social network and that there may be multiple social networks coupled to the network 1005, each having its own server, application and social graph. For example, a first social network may be more directed to business networking, a second may be more directed to or centered on academics, a third may be more directed to local business, a fourth may be directed to dating and others of general interest or a specific focus.

In some implementations, the social network server 1001 receives and sends data and social information provided by the other servers 1007, 1011, 1021, 1023, 1029, 1031 and 1035. For example, the social network server 1001 receives and sends any social information or events performed on any web pages and/or applications hosted by the servers 1007, 1011, 1021, 1023, 1029, 1031 and 1035. The web pages and/or applications include a user interface allowing a user 1020*n* to respond to, comment or endorse a product, a video, a search result, a widget, a post, a comment, a photo, an article, etc., shown on the web pages and/or applications.

In some implementations, the social network server 1001, the third party server 1007, location server 1011, the Micro Blogging server 1021, the email server 1023, the SMS/MMS server 1029, the IM server 1031 and the search server 1035 are hardware servers including a processor, a memory, and network communication capabilities.

The location server 1011 is coupled to the network 1005 via signal line 1006 for communication and cooperation with the other components of the system 1000. The location server 1011 is coupled to receive location information from the client devices 1015. The location server 1011 can receive updates from the client devices 1015 as to their location and maintains a log or database of location information. The location server 1011 may use a variety of different communication protocols to determine location including but not limited to global positioning systems (GPS), Wi-Fi, GSM localization, Cellular triangulation, near field communication technologies, Bluetooth, infrared, etc. The location server 1011 can receive periodic reports or updates from the client devices 1015 as to location. In some implementations, the location server 1011 can poll client devices 1015 for the location. In some implementations, the client devices 1015 may update the location server 1011 anytime location has changed. In the illustrated implementation, the location server 1011 includes a notification surfacing module 103*c*.

The client devices 1015 can be any computing device including one or more memory and one or more processors, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. In some implementations, the system 1000 includes a combination of different types of client devices 1015. For example, a combination of a personal computer and a mobile phone. It should be understood that the present technologies can operate on different models other than a client-server architecture. For example, the client devices 1015 may include the notification surfacing module 1003 and include different services. The client device 1015 will be described in more detail with reference to FIG. 11.

The browser 150 can be a web browser stored on the on the client device 1015 and configured for two-way communications with the servers 1001, 1007, 1011, 1021, 1023, 1029, 1031 and 1035. For example, the browser 150 is a software application for retrieving, presenting and traversing information resources on the web. In the illustrated implementation, the browser 150 includes a notification surfacing module 1003*b*.

The network 1005 enables communications between the client devices 1015*a-n*, the social network server 1001, the third party server 1007, the location server 1011, the Micro Blogging server 1021, the email server 1023, the SMS/MMS server 1029, the IM server 1031 and the search server 1035. Thus, the network 1005 can include links using technologies including, for example, Wi-Fi, Wi-Max, 2G, Universal Mobile Telecommunications System (UMTS), 3G, Ethernet, 502.11, integrated services digital network (ISDN), digital subscriber line (DSL), asynchronous transfer mode (ATM), InfiniBand, PCI Express Advanced Switching, etc. Similarly, the networking protocols used on the network 1005 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High- Speed Downlink Packet Access (HSDPA), etc. The data exchanged over the network 1005 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In some implementations, the entities can use custom and/or dedicated data communications technologies instead of, or in addition to, the ones described above. Depending upon the implementation, the network 1005 can also include links to other networks.

In some implementations, the network 1005 is a partially public or a wholly public network, for example, the Internet. The network 1005 can also be a private network or include one or more distinct or logical private networks (e.g., virtual private networks, Wide Area Networks ("WAN") and/or Local Area Networks ("LAN")). Additionally, the communication links to and from the network 1005 can be wired or wireless (i.e., terrestrial or satellite-based transceivers). In some implementations, the network 1005 is an IP-based wide or metropolitan area network.

The network 1005 may have any number of configurations including a star configuration, token ring configuration or other configurations. Furthermore, the network 1005 may include a local area network (LAN), a wide area network (WAN) (e.g., the Internet), and/or any other interconnected data path across which multiple devices may communicate. In some implementations, the network 1005 may be a peer-to-peer network. The network 1005 may also be coupled to or include portions of a telecommunications network for sending data in a variety of different communication protocols. In some implementations, the network 1005 includes short-wavelength communication networks or a cellular communications network for sending and receiving data including via short messaging service (SMS), multimedia messaging service (MMS), hypertext transfer protocol (HTTP), direct data connection, wireless application protocol (WAP), electronic messages, etc.

Figure 11:
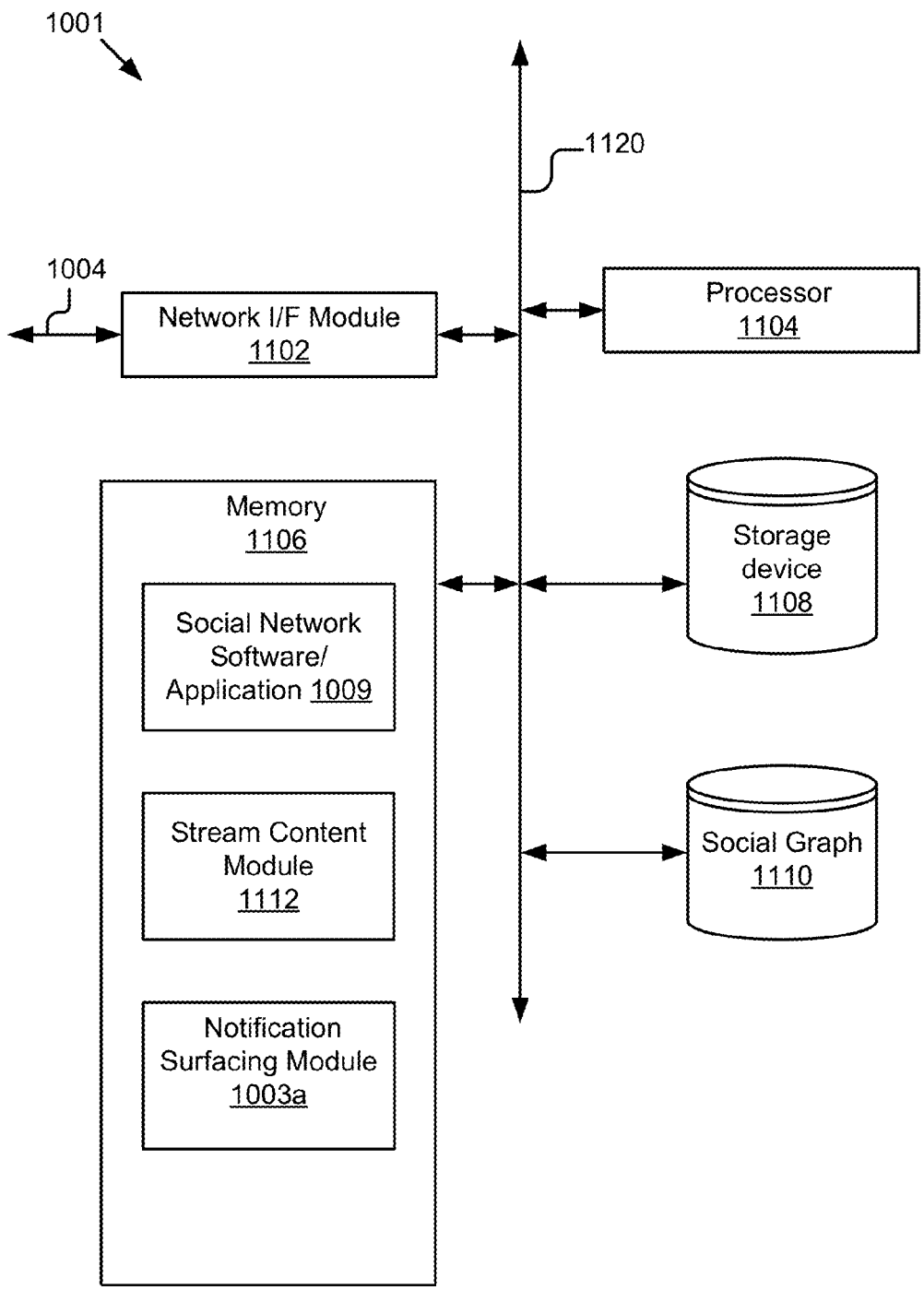
FIG. 11 is a block diagram illustrating an example social network server including a notification surfacing module.

FIG. 11 illustrates the social network server 1001 according to some implementations of the present disclosure. In the illustrated implementations, the social network server 1001 includes the network interface (I/F) module 1102, a processor 1104, a memory 1106, a storage device 1108 and a social graph 1110. These components of the social network server 1001 are communicatively coupled to a bus or software communication mechanism 1120 for communication with each other.

The network interface module 1102 is coupled to the network 1005 by signal line 1004. The network interface module 1102 is also coupled to the bus 1120. The network interface module 1102 includes ports for wired connectivity including but not limited to USB, SD, or CAT-5, etc. The network interface module 1102 links the processor 1104 to the network 1005 that may in turn be coupled to other processing systems. The network interface module 1102 provides other conventional connections to the network 1005 using standard network protocols, e.g., TCP/IP, HTTP, HTTPS and SMTP. In some implementations, the network interface module 1102 includes a transceiver for sending and receiving signals using WiFi, Bluetooth® or cellular communications for wireless communication.

The processor 1104 may include an arithmetic logic unit, a microprocessor, a general purpose controller or some other processor array to perform computations and provide electronic display signals to a display device. In some implementations, the processor 1104 is a hardware processor. The processor 1104 is coupled to the bus 1120 for communication with the other components. Processor 1104 processes data signals and may include various computing architectures including a complex instruction set computer (CISC) architecture, a reduced instruction set computer (RISC) architecture, or an architecture implementing a combination of instruction sets. Although only a single processor is shown in FIG. 11, multiple processors may be included. It should be understood that other processors, operating systems, sensors, displays and physical configurations are possible.

The memory 1106 stores instructions and/or data that may be executed by the processor 1104. In the illustrated implementation, the memory 1106 stores the social network software/application 1009, the stream content module 1112 and the notification surfacing module 1003a. The memory 1106 is coupled to the bus 1120 for communication with the other components of the social network server 1001. The instructions and/or data may include code for performing any and/or all of the techniques described herein. The memory 1106 may be a dynamic random access memory (DRAM) device, a static random access memory (SRAM) device, flash memory or some other memory devices.

The storage device 1108 may be a non-transitory memory that stores data. For example, the storage device 1108 may be a dynamic random access memory (DRAM) device, a static random access memory (SRAM) device, flash memory or some other memory device. In some implementations, the storage device 1108 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device. In some implementations, the storage device 1108 stores data received from and sent to users 1020n to accomplish the functionalities described herein of the notification surfacing module 1003a.

Software communication mechanism 1120 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc). The software communication mechanism 1120 can be implemented on any underlying hardware, for example, a network, the Internet, a bus, a combination thereof, etc.

The stream content module 1112 can be software or routines for generating a stream of content tailored or particular to the user. In FIG. 11, the stream content module 1112 is shown as a module that is operationally part of the memory 1106. In some implementations, the stream content module 1112 may be part of the social network application 1009. The social network application 1009 may cooperate with the social network application 1009 to generate and provide the stream of content. Based upon the user's interests, social graph, interactions and other factors, the stream content module 222, may generate a stream of content tailored to the user. The stream content module 1112 may be software including routines for generating and providing the stream of content. In some implementations, the stream content module 1112 may be a set of instructions executable by the processor 1104 to provide the functionality described herein for generating and providing the stream of content. In some implementations, the stream content module 1112 may be stored in the memory 1106 of the server 1001 and is accessible and executable by the processor 1104. In some implementations, the stream content module 1112 may be adapted for cooperation and communication with the processor 1104 and other components of the server 1001 via bus 1120.

The notification surfacing module 1003 generates notifications for presentation based on location, relationships and identity. In some implementations, the notification surfacing module 1003 also uses real world context to determine which notifications to generate and present. The notification surfacing module 1003 receives and processes the signals from the location server 1011 or the client device 1015 to retrieve location information. The notification surfacing module 1003 receives and processes the signals from the social network application 1009 to retrieve relationship information including relationships with other people, relationships with things, interests and other information. The notification surfacing module 1003 also receives and processes the signals from the social network application 1009 to retrieve credential and authorization information. In some implementations, the notification surfacing module 1003 can receive and process signals from other sources, for example a profile server, to retrieve credential and authorization information. The notification surfacing module 1003 processes the information from these resources to surface, generate and provide notifications based on location. In some implementations, the notification surfacing module 1003 determines an identification (ID) to automatically and intelligently connect the user to places/locations and what the user can do at that place/location. The notification surfacing module 1003 may also automatically determining where the user is and tell the user what she can do (post pictures, comments, notify others to some, broadcast your location to public, pay your bill, comment on post about location, other functions related to location (e.g., hotel check in, restaurant check in, etc.). In some implementations, the notification surfacing module 1003 connects people to places by using an identity or identification to offer up available services (e.g. payments, etc.) and social opportunities (e.g. backchannel conversations, 1-1 notes) at the real world places that users visit. The notification surfacing module 1003 may create and maintains a private and shared history with the places with which people visit and transact. The operation of the notification surfacing module 1003 will be described in more detail with reference to FIGS. 1-4 and 12. In some implementations, the notification surfacing module 1003 may interact with the third party server 1007, the location server 1011, the Micro Blogging server 1021, the email server 1023, the SMS/MMS server, the IM server 1031, the search server 1035 and any other entities (not pictured) that can be included in the system 1000. In some implementations, the notifications surfacing module 1003 may be an application that can be activated or installed on the mobile device of the user.

Figure 12:
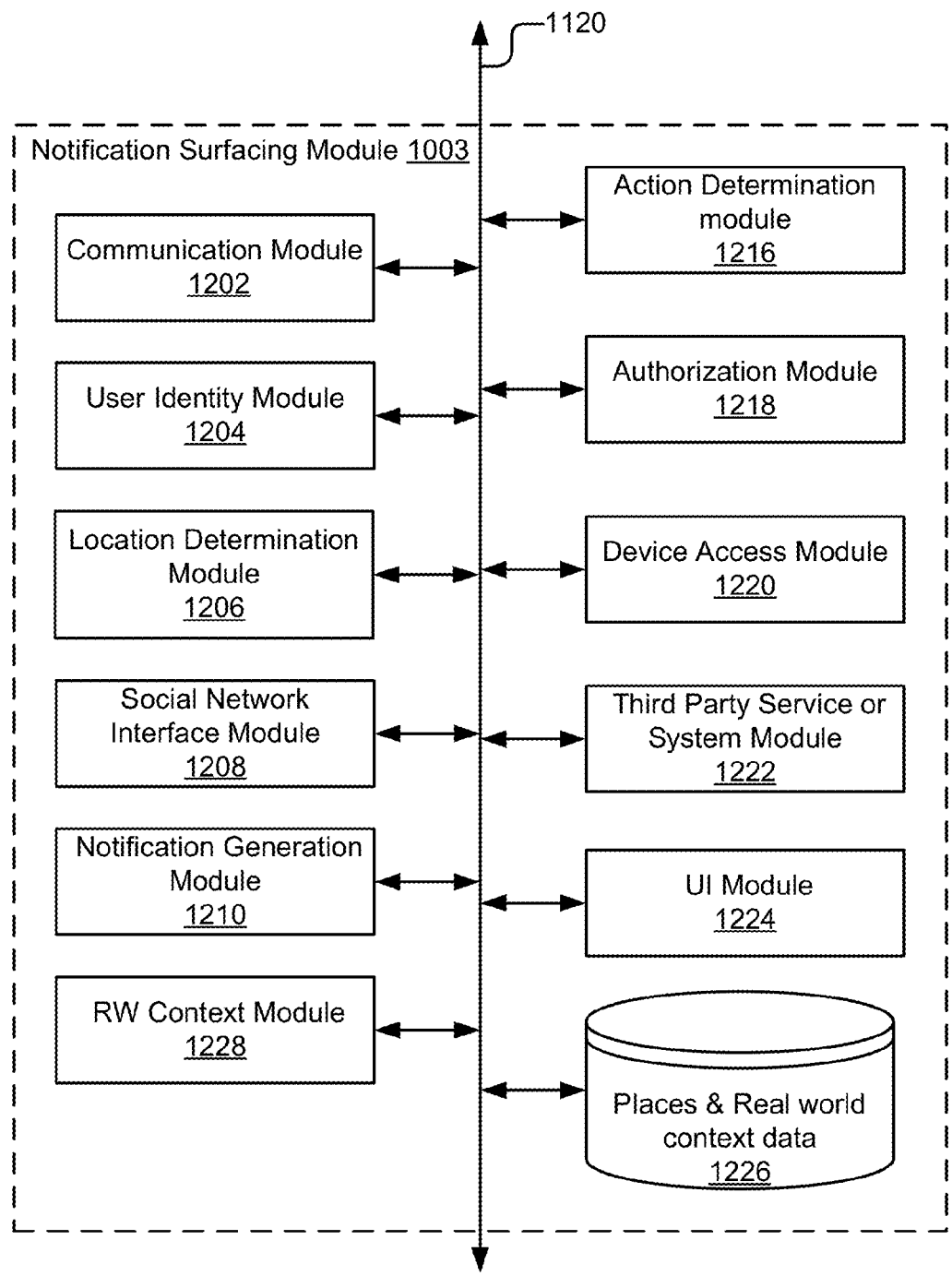
FIG. 12 is a block diagram illustrating an example notification surfacing module stored on the social network server.

Referring now to FIG. 12, the notification surfacing module 1003a is described in more detail according to some implementations. The notification surfacing module 1003a includes a communication module 1202, a user identity module 1204, a location determination module 1206, a social network interface module 1208, a notification generation module 1210, an action determination module 1216, an authorization module 1218, a device access module 1220, a third-party service or system module 1222, a user interface module 1224, a places and real world context data storage 1226, and a real world context module 1228.

The communication module 1202 can be software or routines for handling communications between the user identity module 1204, the location determination module 1206, the social network interface module 1208, the notification generation module 1210, the action determination module 1216, the authorization module 1218, the device access module 1220, the third-party service or system module 1222, the user interface module 1224, the places and real world context data storage 1226, and the real world context module 1228. The communication module 1202 also facilitates communication with the other components of the social network server 1001 as well as communication with the other components of the system 1000 via the network interface module 1102 and the network 1005. For example, the communication module 1202 may send signal between servers and the components of the notification surfacing module 1003. In some implementations, the communication module 1202 is a set of instructions executable by the processor 1104. In some implementations, the communication module 1202 is stored in the memory 1106 of the social network server 1001 and is accessible and executable by the processor 1104. In some implementations, the communication module 1202 is adapted for cooperation and communication with the processor 1104, the memory 1106 and other components of the notification surfacing module 1003 via the bus 1120.

The user identity module 1204 can be software or routines for determining an identification (ID) for a user. In some implementations, the identification is associated with a portable device and may include a user name and password. For example, the identification may be the username and password corresponding to a user to access the social network application 1009 for retrieval of social information of the user. In some implementations, the identification is the username and password used for a profile server. The profile server (not pictured) in turn may include other usernames and passwords for other systems and devices. The user identity module 1204 includes routines for accessing identity information so that the other components of the notification surfacing module 1003 can retrieve other information (e.g., location, access to services, access to devices, interests, relationships or social graphs, etc.) from other systems. In some implementations, the notification surfacing module 1003 connects users to places and services via authentication using a single identity based on the things they choose to do at a place/establishment. In general, the user can present their identity to a place (business or establishment) and use that single identity for different actions, services and transactions at that place. That same single identity can be used on an incremental basis on a single visit or over the course of multiple visits to authorize additional or different actions, services and transactions. For example, a user might initially only share their presence at the place. The user could then incrementally authorize sharing more information, for example preferences for food at a restaurant. Finally, the user could incrementally add an auto payment authorization. If a user decides to enable co-presence whenever they visit a place, he inputs his consent or authorization via an "I'm Here" consent dialogue. Should a user decide to use a service when they visit a place/establishment (e.g. pay via a mobile payment system), he will input his consent or authorization via an auto pay consent notification. In some implementations, the user identity module 1204 is a set of instructions executable by the processor 1104. In some implementations, the user identity module 1204 is stored in the memory 1106 of the social network server 1001 and is accessible and executable by the processor 1104. In some implementations, the user identity module 1204 is adapted for cooperation and communication with the processor 1104, the memory 1106 and other components of the notification surfacing module 1003a via the bus 1120.

The location determination module 1206 can be software or routines for determining a location of the user. In some implementations, the location determination module 1206 is coupled to receive location update signals from the client device 1015 or the location server 1011. The location determination module 1206 can access the places and real world context data 1226 to identify a place associated with the location (e.g., perform placed detection). In some implementations, the notification surfacing module 1003 knows the places (as opposed to location) a user visits, beyond just latitude and longitude. The notification surfacing module 1003 using the location determination module 1206 taps into a database of the user's location history, a database of place metadata, and other place databases to determine the place metadata for the establishment where the place is at (e.g. place name, place type). The location determination module 1206 may also associate the place with the user and the location, and store a time, place and user ID in a place history for the user or their ID. In some implementations, the location determination module 1206 polls or requests location information from the client device 1015 or the location server for a particular ID. The location determination module 1206 may provide location information to the other components of the notification surfacing module 1003. In some implementations, once the user has consented, the location determination module 1206 can provide real-time location information corresponding to an identification. This real-time information about location can be provided to the notification generation module 1210 and used to determine which notifications if any should be generated and sent to the user. In some implementations, once the user has consented, the location determination module 1206 can determine when a user arrives at a place, and when they depart from a place. Arrival and departure is used in various ways to enhance a person's experience to record visits into a person's place history stream, enhance co-presence while at a place, and give vendors better signals to serve people visiting their establishments. In some implementations, the location determination module 1206 is a set of instructions executable by the processor 1104. In some implementations, the location determination module 1206 is stored in the memory 1106 of the social network server 1001 and is accessible and executable by the processor 1104. In some implementations, the location determination module 1206 is adapted for cooperation and communication with the processor 1104, the memory 1106 and other components of the notification surfacing module 1003a via the bus 1120.

The social network interface module 1208 can be software or routines for retrieving relationship information using the identification for the user. The social network interface module 1208 is coupled to receive identity information from the user identity module 1204. Using the identity information, the social network interface module 1208 can retrieve relationship information from the social network application 1009. Location information or a place from the location determination module 1206 can also be used to retrieve information from the social network 1009. The social network interface module 1208 can also retrieve social information (e.g., posts, shares, re-shares, endorsements, interests, topics of social network activities, people interacting with on the social network, relationships or social graphs, etc.). This relationship information or social information can be used to filter, rank or determine the context and content for generating notifications. In some implementations, the social network interface module 1208 is a set of instructions executable by the processor 1104. In some implementations, the social network interface module 1208 is stored in the memory 1106 of the social network server 1001 and is accessible and executable by the processor 1104. In some implementations, the social network interface module 1208 is adapted for cooperation and communication with the processor 1104, the memory 1106 and other components of the notification surfacing module 1003a via the bus 1120. In such a manner, the social network interface module 1208 can provide relationship information or social information to the other components of the notification sharing module 1003.

The notification generation module 1210 can be software or routines for generating a notification related to the location of the user. The notification may include notification information and/or one or more user interface elements. Example notifications is described in more detail above with reference to FIGS. 5A-5D. The location, place or location information is received by the notification generation module 1210 from the location determination module 1206. The identification information is received by the notification generation module 1210 from the user identity module 1204. The notification generation module 1210 may retrieve a first set of information related to the location information and identification information. The notification generation module 1210 may then filter or rank the first set of information using the relationship information received from the social network interface module 1208 to produce notification information. In some implementations, the top ranked information is selected for inclusion as part of the notification. The notification generation module 1210 may then provide the notification to the user. In some implementations, the notification generation module 1210 generates the notification using the notification information and user interface elements from the user interface module 1224. In some implementations, the notification information can include one or more actions that the user can perform at the particular location. The actions are provided by the action determination module 1216 to the notification generation module 1210. The notification generation module 1210 pushes the appropriate notification at the right time to users. General example notifications include: arrival detection, viewing a post, viewing places nearby, viewing photos of nearby places, performing an action on a social network, interacting with a device, determining people nearby, interesting places nearby, performing a transaction, updating a profile, history with a place, past actions at a place, authorizations set for a place, providing authorization or providing consent. In some implementations, the notification generation module 1210 is a set of instructions executable by the processor 1104. In some implementations, the notification generation module 1210 is stored in the memory 1106 of the social network server 1001 and is accessible and executable by the processor 1104. In some implementations, the notification generation module 1210 is adapted for cooperation and communication with the processor 1104, the memory 1106 and other components of the notification surfacing module 1003a via the bus 1120.

The action determination module 1216 can be software or routines for determining an action performable by the user. The action determination module 1216 is coupled to receive the location, the identity and information from other modules and determine what actions are available to be performed for the given location and user. The action determination module 1216 is also coupled to the other components to determine devices or third party systems upon which action can be taken. For example, actions include: viewing a post, viewing places nearby, performing an action on a social network, interacting with a device, determining people nearby, performing a transaction, updating a profile, providing authorization or providing consent. In some implementations, the action determination module 1216 provides one or more action and a link to perform the action to the notification generation module 1210 for incorporation into the notification. In some implementations, the action determination module 1216 is a set of instructions executable by the processor 1104. In some implementations, the action determination module 1216 is stored in the memory 1106 of the social network server 1001 and is accessible and executable by the processor 1104. In some implementations, the action determination module 1216 is adapted for cooperation and communication with the processor 1104, the memory 1106 and other components of the notification surfacing module 1003a via the bus 1120.

The authorization module 1218 can be software or routines for retrieving authentication or credential information. The authorization module 1218 can provide the authentication or credential information to the other components of the notification surfacing module 1003 for use in performing their functions. For example, the authentication or credential information may be provided for inclusion in the notification so that particular actions may be taken using the notification itself. In some implementations, the authorization module 1218 cooperates with the social network interface module 1208 to retrieve authentication or credential information from the social network application 1009. The authentication or credential information may be used by the notification generation module 1210 to filter data from the first set of information. In some implementations, the authorization module 1218 retrieves the authentication or credential information from the third-party systems, third party services, or devices themselves. In some implementations, the authorization module 1218 allows a user to operate in incognito mode. In such a mode, the location of the user is not displayed and not provided or made visible to other users. However, the user while in incognito mode can see the locations of other users as well as receive notifications related to their location. In some implementations, the authorization module 1218 is a set of instructions executable by the processor 1104. In some implementations, the authorization module 1218 is stored in the memory 1106 of the social network server 1001 and is accessible and executable by the processor 1104. In some implementations, the authorization module 1218 is adapted for cooperation and communication with the processor 1104, the memory 1106 and other components of the notification surfacing module 1003a via the bus 1120.

The device access module 1220 can be software or routines for determining one or more devices proximate a location. More specifically, the device access module 1220 identifies any devices near a location that are capable of being controlled based on the user's identification. The device access module 1220 is coupled to receive the location, the identity and information from other modules and determine what devices are available to control for the given location and user. The device access module 1220 provides communication protocols for communication with the devices and their associated systems. In some implementations, the device access module 1220 provides a link to perform the action on an identified device to the notification generation module 1210 for incorporation into the notification. In some implementations, the device access module 1220 is a set of instructions executable by the processor 1104. In some implementations, the device access module 1220 is stored in the memory 1106 of the social network server 1001 and is accessible and executable by the processor 1104. In some implementations, the device access module 1220 is adapted for cooperation and communication with the processor 1104, the memory 1106 and other components of the notification surfacing module 1003a via the bus 1120.

The third-party service or system module 1222 can be software or routines for determining a third-party service or system related to a location. More specifically, the third-party service or system module 1222 identifies any third-party services or systems with which the user may want to interact based on their location and identification. The third-party service or system module 1222 is coupled to receive the location, the identity and information from other modules and determine what actions or services that the third-party service or system can provide that are relevant for given location and user. The third-party service or system module 1222 provides communication protocols for communication with the third-party service or system. In some implementations, the third-party service or system module 1222 provides a link to perform the action on an identified third-party service or system to the notification generation module 1210 for incorporation into the notification. In some implementations, the third party service may be any other service(s) provided by the system 1000 or other third party server 1007, for example, a payment service, a reservation service, a check-in service, a check out service, a ordering service, a confirmation service, a notification service, an accessing (opening, closing, locking or unlocking) service, a communication service, a location service, a language translation service, a polling service, a verification service, a recording service or other service related to a place. In some implementations, the third-party service or system module 1222 is a set of instructions executable by the processor 1104. In some implementations, the third-party service or system module 1222 is stored in the memory 1106 of the social network server 1001 and is accessible and executable by the processor 1104. In some implementations, the third-party service or system module 1222 is adapted for cooperation and communication with the processor 1104, the memory 1106 and other components of the notification surfacing module 1003a via the bus 1120.

The user interface module 1224 can be software or routines for generating a user interface element and providing it to the notification generation module 1210 for inclusion in a notification. The user interface module 1224 also generates updates to the user interface element. The user interface module 1224 is coupled to receive an initiation signal from the notification generation module 1210. The user interface module 1224 generates a user interface for inclusion in the notification. Example user interface elements produced by the user interface module 1224 are shown and described in more detail above with reference to FIGS. 5-12. The user interface module 1224 also receives changes to the user interface element and actions. The user interface module 1224 processes these changes to produce updates to the user interface element. In some implementations, the user interface module 1224 is a set of instructions executable by the processor 1104. In some implementations, the user interface module 1224 is stored in the memory 1106 of the social network server 1001 and is accessible and executable by the processor 1104. In some implementations, the user interface module 1224 is adapted for cooperation and communication with the processor 1104, the memory 1106 and other components of the notification surfacing module 1003a via the bus 1120.

The places and real world context data storage 1226 is data storage for storing information about places and their associated locations. The places and real world context data storage 1226 also stores real world context data for use by the other components of the notification surfacing module 1003. The places and real world context data storage 1226 is coupled to the software communication mechanism 1120 to provide access to this information to the other components of the national notification surfacing module.

The real world context module 1228 can be software or routines for reviewing information retrieved by the user identity module 1204, the location determination module 1206, and the social network interface module 1208 to determine a context for an identified user. The notification surfacing module 1003 knows the right thing to present to a user at the right time, and accomplishes this by using signals to determine: available services at a place, ranking of services/notifications available at a place and appropriate time to suggest services to a user. The real world context module 1228 retrieves information about the user and the real world and stores that data in the places and real world context data storage 1226. The real world context module 1228 and later retrieve that information to improve the notifications that are generated by the notification generation module 1210. The real world context module 1228 provide signals to the notification generation module 1210 that allow it to better filter and rank notifications for a given user. In some implementations, the real world context module 1228 is a set of instructions executable by the processor 1104. In some implementations, the real world context module 1228 is stored in the memory 1106 of the social network server 1001 and is accessible and executable by the processor 1104. In some implementations, the real world context module 1228 is adapted for cooperation and communication with the processor 1104, the memory 1106 and other components of the notification surfacing module 1003a via the bus 1120.

In situations in which the systems, for example the real world interaction module 1003a, discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the real world interaction module 1003a that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (e.g. to a city, ZIP code, or state level), so that a particular location of a user cannot be determined. Thus, the user may have control over how information is collected about the user and used by the real world interaction module 1003a.

Systems and methods for surfacing real-time notifications based on location have been described. While the present disclosure is described in the context of a social network, it should be understood that the terms "products" and "services" are used interchangeably throughout this specification and are used herein to encompass their plain and ordinary meaning including, but not limited to any online service, online product, online software that provides services to users.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
   determining, using one or more processors, an identification for a user;
   determining, using the one or more processors, a location of the user;
   retrieving, using the one or more processors, a list of accessible devices related to the location of the user and the identification for the user and a list of third party services related to the location of the user and the identification for the user;
   retrieving, using the one or more processors, relationship information using the identification for the user;
   determining, using the one or more processors, using the list of accessible devices related to the location and the identification of the user and the list of third party services related to the location of the user and the identification for the user, a plurality of heterogeneous actions that are available to the user by virtue of the location of the user;
   filtering, using the one or more processors, the plurality of heterogeneous actions that are available to the user by virtue of the location of the user using the relationship information;
   determining, using the one or more processors, notification information associated with an action available to the user by virtue of the location of the user determined based on a ranking of the filtered plurality of heterogeneous actions that are available to the user by virtue of the location of the user;
   generating, using the one or more processors, a notification related to the location of the user and including the notification information; and
   providing, using the one or more processors, the notification for presentation to the user,
   wherein the determining the notification information, the generating the notification, and the providing the notification are performed automatically in that performance occurs without a user input requesting the notification subsequent to enablement of notifications.

2. The method of claim 1 wherein determining the location includes identifying a place associated with the location, and further comprising:
   associating the place with the user and the location; and
   storing a time and place in a history for the identification.

3. The method of claim 1, wherein retrieving the relationship information retrieves information from a social network using the identification and the location.

4. The method of claim 1 further comprising:
   determining a device proximate the location, the device being controllable using the identification; and
   wherein the notification includes a link to an interface to control the device, wherein controlling the device is the action available to the user by virtue of the location of the user.

5. The method of claim 1 further comprising:
   determining a service related to the location, the service being controllable using the identification; and wherein the notification includes a link to an interface to access the service, wherein accessing the service is the action available to the user by virtue of the location of the user.

6. The method of claim 1, wherein the notification includes a link to perform the action available to the user by virtue of the location of the user.

7. The method of claim 6, wherein the action available to the user by virtue of the location of the user is one from a group of: viewing a post, viewing places nearby, performing an action on a social network, interacting with a device, determining people nearby, performing a transaction, updating a profile, providing authorization or providing consent.

8. The method of claim 1, wherein the relationship information includes authentication and credential information that can be used to filter data from the list of accessible devices and the list of third party services.

9. A computer program product comprising a non-transitory computer usable medium including a computer readable program, wherein the computer readable program when executed on a computer causes the computer to:
  determine an identification for a user;
  determine a location of the user;
  retrieve a list of accessible devices related to the location and the identification for the user and a list of third party services related to the location of the user and the identification for the user;
  retrieve relationship information using the identification for the user;
  determine, using the list of accessible devices related to the location and the identification of the user and the list of third party services related to the location of the user and the identification for the user, a plurality of heterogeneous actions that are available to the user by virtue of the location of the user;
  filter the plurality of heterogeneous actions that are available to the user by virtue of the location of the user using the relationship information;
  determine notification information associated with an action available to the user by virtue of the location of the user determined based on a ranking of the filtered plurality of heterogeneous actions that are available to the user by virtue of the location of the user;
  generate a notification related to the location of the user and including the notification information; and
  provide the notification for presentation to the user,
  wherein the determining the notification information, the generating the notification, and the providing the notification are performed automatically in that performance occurs without a user input requesting the notification subsequent to enablement of notifications.

10. The computer program product of claim 9, wherein the determination of the location includes identifying a place associated with the location and wherein the computer readable program when executed on a computer also causes the computer to:
  associate the place with the user and the location; and
  store a time and place in a history for the identification.

11. The computer program product of claim 9, wherein the retrieval of the relationship information retrieves information from a social network using the identification and the location.

12. The computer program product of claim 9, wherein the computer readable program when executed on a computer also causes the computer to:
  determine a device proximate the location, the device being controllable using the identification; and
  wherein the notification includes a link to an interface to control the device, wherein controlling the device is the action available to the user by virtue of the location of the user.

13. The computer program product of claim 9, wherein the computer readable program when executed on a computer also causes the computer to:
  determine a service related to the location, the service being controllable using the identification; and
  wherein the notification includes a link to an interface to access the service, wherein accessing the service is the action available to the user by virtue of the location of the user.

14. The computer program product of claim 9, wherein the notification includes a link to perform the action.

15. The computer program product of claim 14, wherein the action available to the user by virtue of the location of the user is one from a group of: viewing a post, viewing places nearby, performing an action on a social network, interacting with a device, determining people nearby, performing a transaction, updating a profile, providing authorization or providing consent.

16. The computer program product of claim 9, wherein the relationship information includes authentication and credential information that can be used to filter data from the list of accessible devices and the list of third party services.

17. A system comprising:
  a processor; and
  a memory storing instructions that, when executed, cause the system to:
    determine an identification for a user;
    determine a location of the user;
    retrieve a list of accessible devices related to the location of the user and the identification for the user and a list of third party services related to the location of the user and the identification for the user;
    retrieve relationship information using the identification for the user;
    determine, using the list of accessible devices related to the location and the identification of the user and the list of third party services related to the location of the user and the identification for the user, a plurality of heterogeneous actions that are available to the user by virtue of the location of the user;
    filter the plurality of heterogeneous actions that are available to the user by virtue of the location of the user using the relationship information;
    determine notification information associated with an action available to the user by virtue of the location of the user determined based on a ranking of the filtered plurality of heterogeneous actions that are available to the user by virtue of the location of the user;
    generate a notification related to the location of the user and including the notification information; and
    provide the notification for presentation to the user,
    wherein the determining the notification information, the generating the notification, and the providing the notification are performed automatically in that performance occurs without a user input requesting the notification subsequent to enablement of notifications.

18. The system of claim 17, wherein the determination of the location includes identifying a place associated with the location and the memory also stores instructions that, when executed, cause the system to:

associate the place with the user and the location; and store a time and place in a history for the identification.

19. The system of claim 17, wherein the retrieval of the relationship information retrieves information from a social network using the identification and the location.

20. The system of claim 17, wherein the memory also stores instructions that, when executed, cause the system to:
determine a device proximate the location, the device being controllable using the identification; and
wherein the notification includes a link to an interface to control the device, wherein controlling the device is the action available to the user by virtue of the location of the user.

21. The system of claim 17, wherein the memory also stores instructions that, when executed, cause the system to:
determine a service related to the location, the service being controllable using the identification; and
wherein the notification includes a link to an interface to access the service, wherein accessing the service is the action available to the user by virtue of the location of the user.

22. The system of claim 17, wherein the notification includes a link to perform the action.

23. The system of claim 22, wherein the action available to the user by virtue of the location of the user is one from a group of: viewing a post, viewing places nearby, performing an action on a social network, interacting with a device, determining people nearby, performing a transaction, updating a profile, providing authorization or providing consent.

24. The system of claim 17, wherein the relationship information includes authentication and credential information that can be used to filter data from the list of accessible devices and the list of third party services.

* * * * *